(12) United States Patent
Shiek

(10) Patent No.: US 8,975,886 B2
(45) Date of Patent: Mar. 10, 2015

(54) CHARGING AND DISTRIBUTION CONTROL

(75) Inventor: Latif Ameer Babu Shiek, Pune (IN)

(73) Assignee: Texas Instruments Incorporated, Dallas, TX (US)

( * ) Notice: Subject to any disclaimer, the term of this patent is extended or adjusted under 35 U.S.C. 154(b) by 359 days.

(21) Appl. No.: 13/467,705

(22) Filed: May 9, 2012

(65) Prior Publication Data
US 2013/0113283 A1   May 9, 2013

(51) Int. Cl.
G05F 1/10 (2006.01)
H02H 7/06 (2006.01)
H02M 7/219 (2006.01)
H02J 7/00 (2006.01)
H02M 1/00 (2006.01)

(52) U.S. Cl.
CPC *H02M 7/219* (2013.01); *H02J 7/00* (2013.01); *H02M 2001/007* (2013.01)
USPC .......................... 323/285; 322/25

(58) Field of Classification Search
CPC ................... H02J 7/00; H02M 7/219
USPC .................. 323/266, 268, 282, 284, 285; 322/22–25, 28, 29
See application file for complete search history.

(56) References Cited

U.S. PATENT DOCUMENTS

| 5,373,196 | A | * | 12/1994 | Faley | 307/46 |
| 5,905,357 | A | * | 5/1999 | Kawasaki | 320/104 |
| 7,176,659 | B2 | * | 2/2007 | Asao et al. | 322/28 |
| 7,623,331 | B2 | * | 11/2009 | Harmon et al. | 361/90 |
| 8,437,910 | B2 | * | 5/2013 | Yoshizawa et al. | 701/36 |

* cited by examiner

*Primary Examiner* — Matthew Nguyen
(74) *Attorney, Agent, or Firm* — William B. Kempler; Frederick J. Telecky, Jr.

(57) ABSTRACT

A system configured for charging and distribution control is provided. The system includes a switching regulator, a control circuit and a first converter. The switching regulator is configured to be selectively operable in one of a first operative state and a second operative state based on a control signal. The first operative state and the second operative state are associated with a maximum level of an alternator output power corresponding to at least one alternator operational feature, at least one alternator operational feature being associated with the alternator output voltage and an alternator speed. The control circuit is configured to generate the control signal based at least on the at least one alternator operational feature. The first converter is configured to generate a first converter output voltage based on the regulated DC output voltage. The first converter output voltage is lower than the regulated DC output voltage.

17 Claims, 8 Drawing Sheets

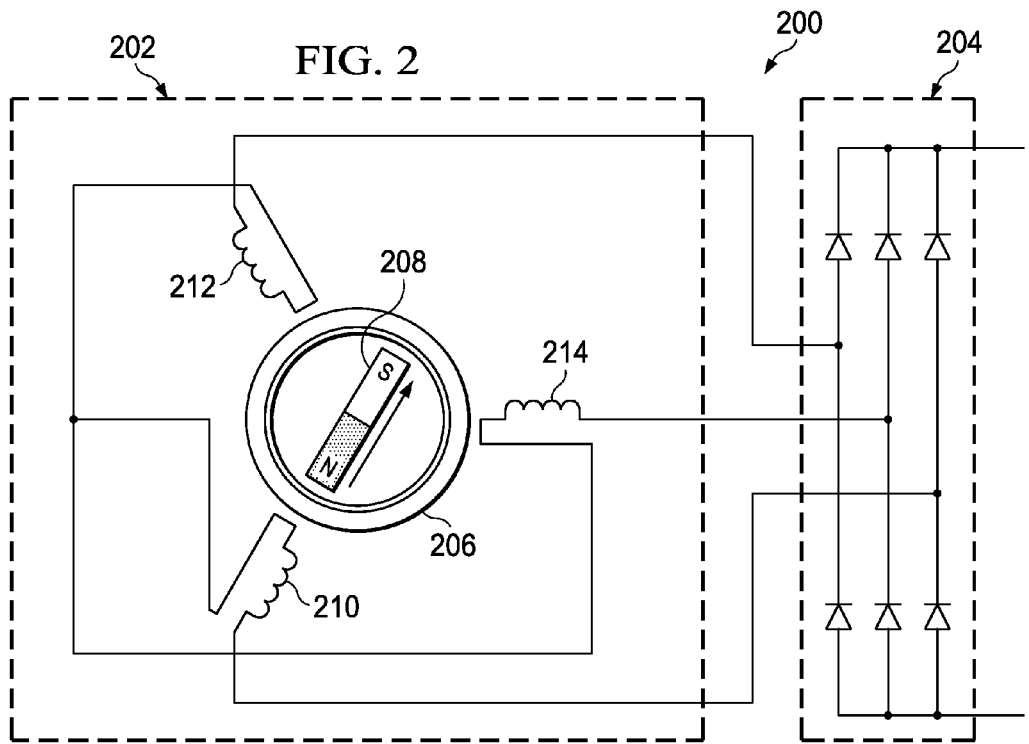
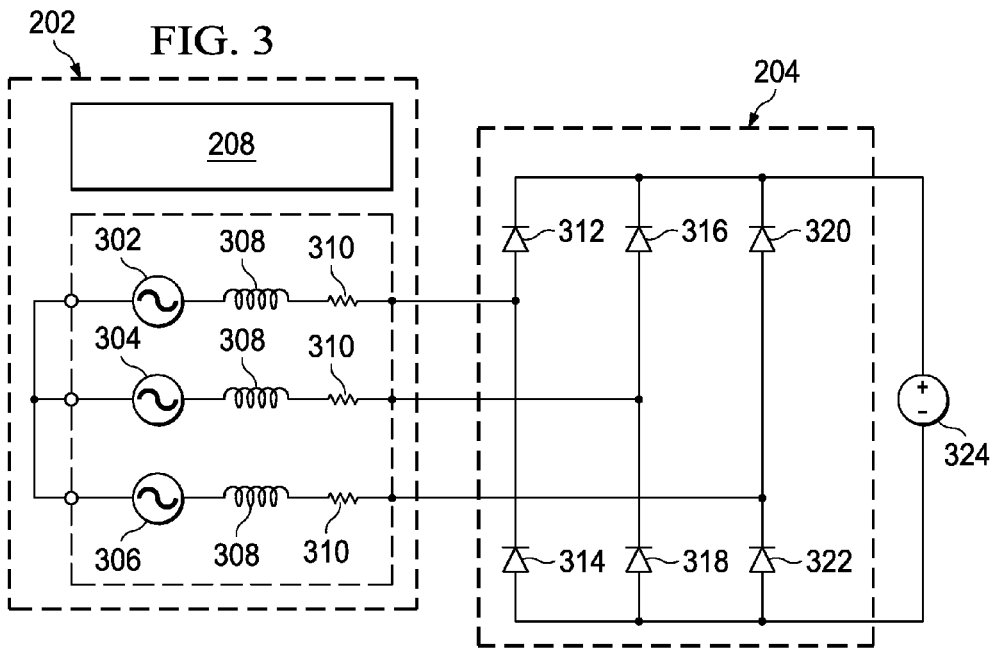

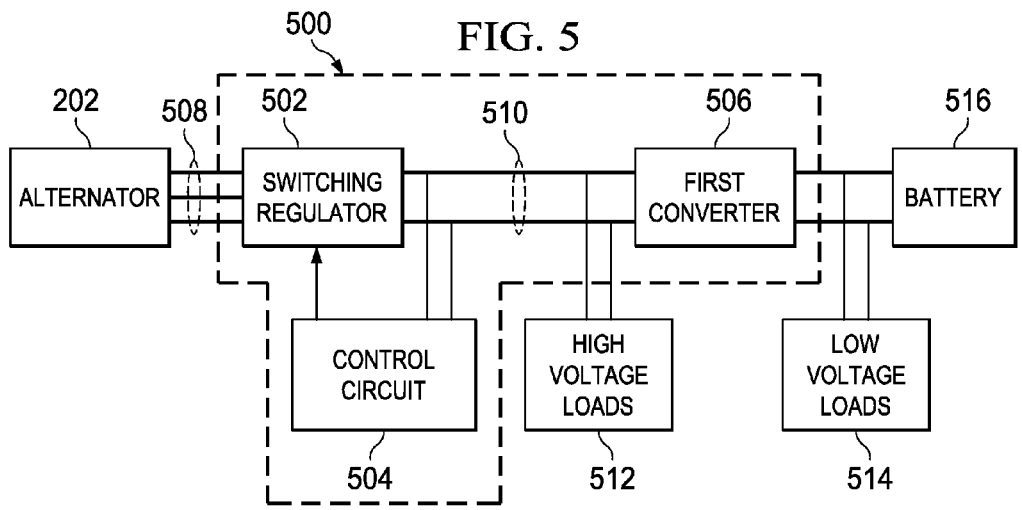
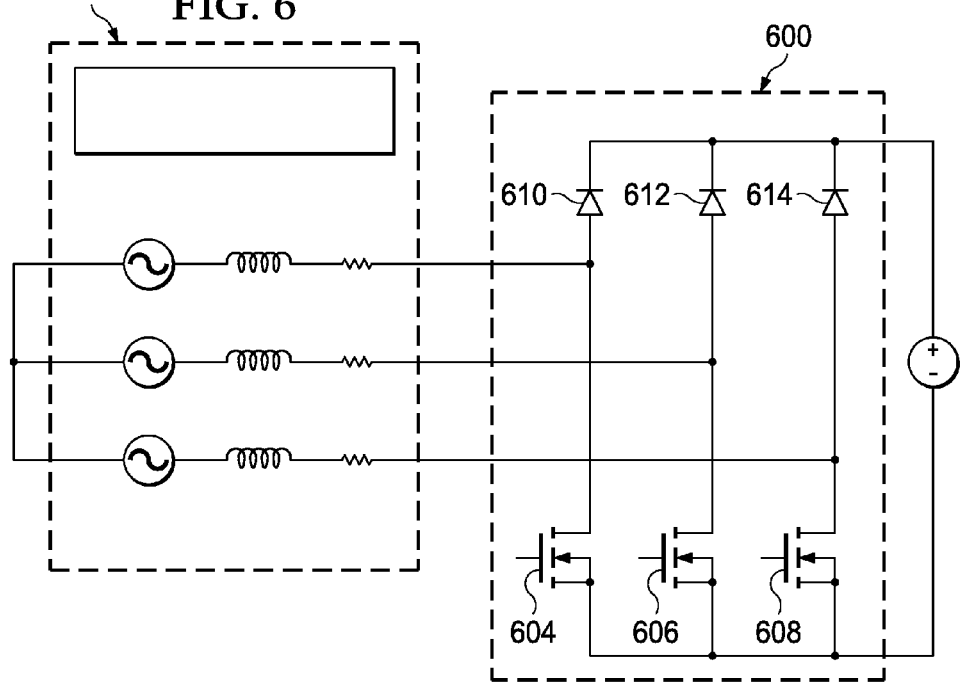

CHARGING AND DISTRIBUTION CONTROL

CROSS-REFERENCE TO RELATED APPLICATIONS

This application claims the benefit of Indian Provisional Patent Application No. 3815/CHE/2011, filed in the Indian Patent Office on Nov. 8, 2011, which is incorporated herein by reference in its entirety.

TECHNICAL FIELD

The present disclosure generally relates to charging and distribution control.

BACKGROUND

In accordance with an exemplary scenario, various vehicles utilize charging and distribution systems to provide electrical power to the vehicles. For example, the charging systems are utilized to charge batteries and power the attached loads, such as lamps, horns, and the like. In one exemplary scenario, the load demands of the vehicles have increased over time, thereby causing an increase in the demand of efficient charging and distribution systems. In general, the charging systems in the vehicle include an alternator that is used to convert mechanical energy from a vehicle engine into electrical energy. The electrical energy may then be utilized to charge the battery and power-up (or activate) other electrical loads of the vehicle.

SUMMARY

Systems configured to provide charging and distribution control (such as in vehicles) are disclosed. In one embodiment, a system includes or comprises a switching regulator, a control circuit, and a first converter. The switching regulator is configured to regulate an alternator output voltage of an alternator and generate a regulated direct current (DC) output voltage. The regulated DC output voltage is capable of being utilized as operational DC bus voltage. The switching regulator is further configured to selectively operate in one of a first operative state and a second operative state based on a control signal. The first operative state and the second operative state of the switching regulator are associated with a maximum level of an alternator output power corresponding to at least one alternator operational feature. The at least one alternator operational feature is associated with the alternator output voltage and an alternator speed. The control circuit is coupled with the switching regulator and is configured to generate the control signal for selectively controlling the operation of the switching regulator in one of the first operative state and the second operative state based on the at least one alternator operational feature. The first converter is coupled with the switching regulator and is configured to generate a first converter output voltage based on the regulated DC output voltage, such that the first converter output voltage is lower than the regulated DC output voltage, and such that a constant level of current associated with the first converter output voltage is sufficient to charge a battery and distributing power to loads.

In one embodiment, a method of charging and distribution control is provided. The method includes regulating, by a switching regulator, an alternator output voltage so as to generate a regulated DC output voltage. The regulated DC output voltage is capable of being utilized as an operational DC bus voltage. The method further includes determining, by a control circuit, an alternator operational feature associated with one of an alternator speed and the alternator output voltage. The operation of the switching regulator is selectively controlled in one of a first operative state and a second operative state based on the determination. The first operative state and the second operative state are associated with a maximum level of the alternator output power corresponding to the alternator operational feature. A first converter output voltage is generated by a first converter based on the regulated DC output voltage, wherein the first converter output voltage is relatively lower than the regulated DC output voltage. A constant level of current associated with the first converter output voltage is sufficient to charge a battery and distribute power to loads.

In one embodiment, an integrated circuit (IC) configured for charging and distribution control (such as in vehicles) is disclosed. The IC includes a charging and distribution control system, a voltage detecting circuit and a speed sensor interface circuit. The charging and distribution control system includes or comprises a switching regulator, a control circuit, and a first converter. The switching regulator is configured to regulate an alternator output voltage of an alternator and generate a regulated DC output voltage. The regulated DC output voltage is capable of being utilized as operational DC bus voltage. The switching regulator is further configured to selectively operate in one of a first operative state and a second operative state based on a control signal. The first operative state and the second operative state of the switching regulator are associated with a maximum level of an alternator output power corresponding to at least one alternator operational feature. The at least one alternator operational feature is associated with the alternator output voltage and an alternator speed. The control circuit is coupled with the switching regulator and is configured to generate the control signal for selectively controlling the operation of the switching regulator in one of the first operative state and the second operative state based on the at least one alternator operational feature. The first converter is coupled with the switching regulator and is configured to generate a first converter output voltage based on the regulated DC output voltage, such that the first converter output voltage is lower than the regulated DC output voltage, and such that a constant level of current associated with the first converter output voltage is sufficient to charge a battery and distributing power to loads. The speed sensor interface circuit is coupled with the alternator and the control circuit, and is configured to facilitate a determination of speed information associated with the alternator speed. The speed sensor interface circuit is further configured to provide the speed information to the control circuit. The voltage detection circuit is coupled with the alternator and the control circuit. The voltage detection circuit is configured to determine a value of the alternator output voltage and provide the value of the alternator output voltage to the control circuit for controlling the operation of the switching regulator in one of the first operative state and the second operative state. The speed sensor interface circuit is coupled with the alternator and the control circuit.

BRIEF DESCRIPTION OF THE VIEWS OF THE DRAWINGS

FIG. 2 illustrates an exemplary charging and distribution system in accordance with an exemplary embodiment;

FIG. 3 illustrates a circuit implementation of an exemplary alternator and a rectifier of a vehicle in accordance with an embodiment;

FIG. 5 illustrates an exemplary block diagram for a system configured for charging and distribution control in a vehicle in accordance with an embodiment;

FIG. 6 illustrates an exemplary circuit diagram of a charging and distribution control system having a switching regulator operable in a first operative state in accordance with an embodiment;

The drawings referred to in this description are not to be understood as being drawn to scale except if specifically noted, and such drawings are only exemplary in nature.

DETAILED DESCRIPTION

Pursuant to an exemplary scenario, in a vehicle, an alternator is utilized to charge a battery that is configured to provide power to start or activate the vehicle. In various embodiments, the battery is charged by an alternator or a magneto that is driven by an engine (e.g., an internal combustion engine). Until or before the engine is on or activated, a current flows through the battery. For example, in the case of a motor bike, a voltage (without a load) of a fully charged battery may be about 13 Volts (V) direct current (DC). Accordingly, in order to charge the battery, a charging system in the motor bike is configured to provide a voltage of about 14.4 V DC. Moreover, the voltage provided to the battery is constant, irrespective of the speed of the engine. An exemplary charging and distribution system for a vehicle motor bike, is described herein with reference to FIG. 1.

Figure 1:
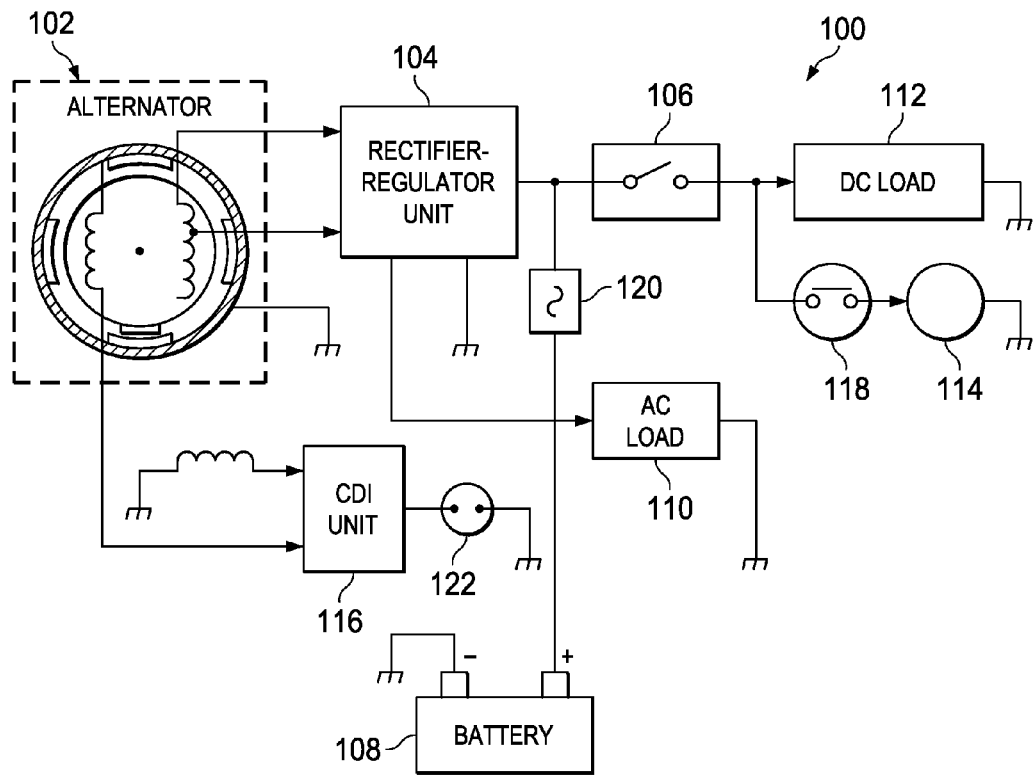
FIG. 1 illustrates an exemplary circuit configured to facilitate charging and distribution in accordance with an exemplary embodiment.

FIG. 1 illustrates an exemplary circuit 100 configured to facilitate a charging and distribution in accordance with an exemplary embodiment. In various embodiments, the circuit 100 for charging and distribution may be implemented in a vehicle. In some example embodiments, the charging and distribution may be implemented in a wind turbine.

Referring to FIG. 1, the circuit 100 comprises or includes an alternator 102, a rectifier-regulator unit 104, an ignition switch 106, a battery 108, loads, for example an AC load represented by AC load 110 and DC loads represented by DC load 112, a starter motor 114, and a capacitive discharge ignition (CDI) unit 116. In various embodiments, in a vehicle, an engine outputs a starting torque sufficient to move or displace the vehicle. In particular, the engine is coupled with a rotor of the alternator 102 such that the operation of the engine rotates the rotor. The engine is cranked by the starter motor 114. In particular, the starter motor 114 is coupled with a solenoid, for example a solenoid 118. When the ignition switch 106 is closed, a starter switch is activated, and a relative small amount of current flows to the solenoid 118. The solenoid 118 engages a lever that pushes out a drive pinion on a starter driveshaft and meshes the pinion with the starter ring gear configured on a flywheel of the engine, thereby allowing a relatively large current to flow from the battery 108 to the starter motor 114, rotating the armature and drive pinion, and causing a crankshaft to rotate. The crankshaft is coupled with the engine, and, with the rotation of the crankshaft, the engine also starts running.

As already discussed, when the engine is started, the engine drives a rotor of the alternator 102, and a three-phase alternating current (AC) is generated by the alternator 102. The generation of a three-phase AC current by an alternator is explained in detail with reference to FIG. 2. In the present embodiment, the alternator 102 is a three-phase alternator, and, accordingly, the three-phase AC is generated by the alternator 102. In various embodiments, the alternator 102 may be a single-phase alternator and configured to generate a single-phase AC. In an exemplary embodiment, the three-phase AC current may be provided as an input to charge the battery, for example the battery 108, and is utilized by a plurality of AC loads 110 associated with the vehicle. Various examples of the AC loads associated with the vehicle may include, but are not limited to, head lamps, tail lamps, and the like.

In an embodiment, the CDI unit 116 is configured to control a timing of ignition of the engine. Also, the CDI unit 116 facilitates the ignition by firing a spark through a spark plug, for example, a spark plug 122, such as to keep the engine running. In an embodiment, the generated 3-phase AC current may be rectified by utilizing a rectifier, for example a rectifier associated with the rectifier-regulator unit 104, so as to generate a direct current (DC) output. In various exemplary embodiments, the stator and the rotor of the alternator and the rectifier-regulator unit 104 may be positioned inside a housing. In various other embodiments, the stator and the rotor of the alternator 102 may be positioned inside the housing while the rectifier-regulator unit 104 may be placed outside the housing.

In an exemplary embodiment, the rectifier utilized to regulate the 3-phase AC current may comprise or include a shunt regulator coupled with or connected in parallel to the alternator 102. The shunt regulator may be configured to carry most of the generated current and regulate the output voltage. It is noted, however, that utilizing the shunt regulator for voltage regulation may cause most of the generated power to be shunted out, thereby resulting in power losses in the circuit. In another exemplary embodiment, a series regulator may be provided in series with the alternator 102 so as to regulate the output voltage generated by the alternator 102. In an exemplary embodiment, operation of the series regulator comprises varying a firing angle or phase angle of a switch for example, a thyristor associated with the series regulator, in order to regulate the voltage. In particular, the variation of the firing angle or the phase angle associated with the switching of the thyristor is configured to determine the amount of charge to be transferred to the load. It is noted, however, that utilizing the series regulator may cause the unutilized power to be dissipated across the thyristor, thereby resulting in a power loss in the circuit.

With reference still to FIG. 1, the rectified output current may be utilized to charge the battery 108 through a fuse, for example, a fuse 120. In various exemplary embodiments, the fuse 120 is configured to protect the loads on occurrence of any faulty connection between the terminals of the battery 108 and the rectifier-regulator unit 104. In various embodiments, the DC output current is provided to DC loads, for example, the DC loads 112. Various examples of DC loads may include, for example, turn signal lamps, horns, brakes and the like.

FIG. 2 illustrates an exemplary charging and distribution system 200 in a vehicle in accordance with an exemplary embodiment. Hereinafter, the charging and distribution system 200 may be referred to as a system 200. As used herein, the charging and distributions system 200 may be an example of the charging and distribution 100 discussed herein with reference to FIG. 1.

In an embodiment, the system 200 includes or comprises an alternator 202 coupled with a rectifier 204. In an exemplary embodiment, the alternator 202 is a magneto. The alternator 202 may be an example of the alternator 102 discussed herein with reference to FIG. 1. The alternator 202 comprises or includes a stationary part, for example, a stator 206 and a rotating part, for example, a rotor 208. The stator comprises or includes a plurality of coils of wire, for example, stator windings 210, 212 and 214. It will be understood that the stator windings for example the stator windings 210, 212, 214 are comprised within the stator, and are shown outside the stator 206 in FIG. 2 for illustrative purposes. The rotor 208 of the alternator 202 comprises a flywheel mounted at an end portion of a crankshaft. The flywheel comprises or includes a heavy wheel and a plurality of permanent magnets embedded into the heavy wheel. The plurality of permanent magnets comprises or includes north poles and south poles. In various embodiments, a mechanical movement is given to a starter, in response to which the flywheel starts spinning. Due to a movement of the flywheel, the plurality of magnets associated with the flywheel passes across stator windings such that the stator windings 210, 212, 214 are exposed alternately with the north pole and the south poles of the rotor, thereby inducing the alternating current (AC) current in the stator windings 210, 212, 214.

In an exemplary embodiment, the stator windings 210, 212, 214 are connected in a star configuration in order to generate 3-phase AC currents. The alternating current or the alternator output voltage being generated at an output of the alternator 202 may be converted into a direct current (DC) power that may be used for a variety of applications. As already discussed, the DC power is used by vehicles, for example a two-wheeled vehicle, to charge a battery and/or to provide power to electrical loads. Various examples of electrical loads associated with a vehicle include head lamps, tail lamps, turn signals, horns, auto-start function devices, electronic speedometers, and the like.

In various embodiments, the alternator output voltage from the alternator is converted into DC voltage by utilizing a rectifier, for example, the rectifier 204. As illustrated in FIG. 2, the rectifier 204 may be, for example, a diode bridge rectifier. An exemplary circuit diagram of the charging and the distribution circuit illustrating the electrical connections between the alternator 202 and the rectifier 204 is explained herein with reference to FIG. 3.

FIG. 3 illustrates a circuit implementation of an exemplary alternator, for example the alternator 202 and a rectifier, for example the rectifier 204 of a vehicle in accordance with an embodiment. As discussed with reference to FIG. 2, the alternator 202 comprises or includes three-phase stator windings and a rotor. In an embodiment, the three-phase windings of the stator are an example of the three-phase windings 210, 212, 214 (e.g., see FIG. 2), and the rotor is an example of the rotor 208. In an embodiment, the rotor 208 comprises permanent magnets having north and south poles such that rotation of the rotor 208 generates a varying magnetic field. When the varying magnetic field interacts with the stator windings 210, 212, 214, an induced current is generated in the stator windings 210, 212, 214, which may generate an induced voltage Vs. The induced voltage Vs may be output from the alternator 202 and provided as an input to the vehicle battery and other loads on the vehicle.

In an embodiment, each phase winding of the three-phase stator winding comprises or includes a voltage source, an inductance and a resistance. For example, corresponding to the three-phases, such as phases A, B and C, each of the phases of the three-phase winding includes a voltage source representative of the phase voltage $V_A$, $V_B$, $V_C$ (shown as 302, 304, 306 in FIG. 3) respectively; inductances Ls (shown as 308 in FIG. 3) and resistances Rs (shown as 310 in FIG. 3). The permanent magnets of the rotor 208 are configured to interact with the three-phase windings to generate a three-phase output voltage, for example, an AC output voltage $V_S$. The AC output voltage Vs is rectified by the rectifier 204. In an exemplary embodiment, the rectifier 204 includes a diode bridge rectifier. In an embodiment, for a three-phase AC system, the diode bridge comprises three legs, with each leg comprising two diodes coupled in series. For example, the three legs of the rectifier 204 comprise three legs, with each leg having two diodes, such as diodes 312, 314 in the first leg, diodes 316, 318 in the second leg and diodes 320, 322 in the third leg.

The rectifier 204 is configured to rectify the generated AC voltage $V_S$ and generate a rectified output voltage Vo (represented as 324). The rectified output voltage $V_o$ may be provided to a battery, for example, the battery 108 (see, e.g., FIG. 1). In an embodiment, the rectified output voltage 324 is unregulated, since the output voltage is based on the speed of rotation of the engine. However, for charging of the battery and various other applications, for example, for supplying loads associated with the vehicle, the output of the charging system may be regulated. In order to regulate the output voltage of the system 200, in an exemplary embodiment, the charging and distribution system may also include a regulator.

In various embodiments, as the speed of the engine of the vehicle increases, the output AC voltage Vo generated by the alternator 202 also increase. When the output AC voltage Vo is greater than a charging voltage that is operative to charge the battery, the AC voltage input Vo from the alternator 202 is shorted to ground. For example, various example rectifier-regulator units comprise or include thyristors that may short the AC voltage input Vo to ground. Accordingly, a charging system with a rectifier-regulator unit 204 may be, for example, either fully charging the battery or not charging the battery. Moreover, the power generated by alternator 202 is dissipated as heat, and, accordingly, the rectifier-regulator unit 204 requires a relatively large heat-sink to handle the dissipated heat, thereby increasing the cost and size of the rectifier-regulator unit 204. Moreover, in certain scenarios, the output current generated by the rectifier-regulator unit 204 is not properly regulated, and it may be fully-dependent on the power generated at the speed of the engine. As an effect of ill-regulated output current, which may be supplied as the charging current to the battery, the lifetime of the battery is decreased due to an increase in the heat dissipated at higher levels of output currents.

In an exemplary scenario, the power generated by the rectifier-regulator unit 204 comprises or includes "spikes" (e.g., up to 90 V within a few milliseconds) and "ripples". As used herein, the term "spikes" may refer to, for example, a relatively high peak voltage of a relatively short duration, for example, a 90 V voltage of 10 milliseconds. The spikes may originate from somewhere in the electrical system of the vehicle. The term "ripple" may refer to, for example, a standard amount of voltage fluctuation. In general, a regulator allows the ripples to pass through after the regulator converts the AC power/voltage that is output from the alternator to DC power/voltage. Due to the presence of "spikes" and "ripples" in the output of the rectifier-regulator unit 204, the power generated by the rectifier-regulator unit 204 is not clean power. Accordingly, if electrical loads such a cluster display unit, a body control unit, a lighting control unit, stereos, and the like, are applied to the charging and distribution system of the vehicle that comprises "spikes" and "ripples", then the noise associated with the "spikes" and "ripples" may damage the electrical loads. Moreover, for light loads such as lamps, the "spikes" may severely damage such loads.

In various exemplary scenarios, the output of the charging and distribution systems at idle conditions or during slow alternator/engine speeds, for example about 1,000 revolutions per minute (rpm) to about 1,200 rpm, is only about one-third (⅓rd) to one-fifth (⅕th) of that at speeds of about 5,000 rpm or higher. This variation in output power at various speed of the alternator/engine is attributed to the fact that the structure of the flywheel where the permanent magnets are embedded is connected directly to the crankshaft without any gear or pulley ratio. At low speeds, the permanent magnets pass very slowly across the stator windings, and, accordingly, the average amount of output voltage/power generated at a particular time is relatively low and cannot charge the battery. Designing an alternator that can generate sufficient power at an idle condition or low speeds is not cost-efficient for the system. A variation of output power with output voltage at different speeds of the alternator, for example the alternator 202 (see, e.g., FIG. 2), is explained herein in detail with reference to FIG. 4.

Figure 4:
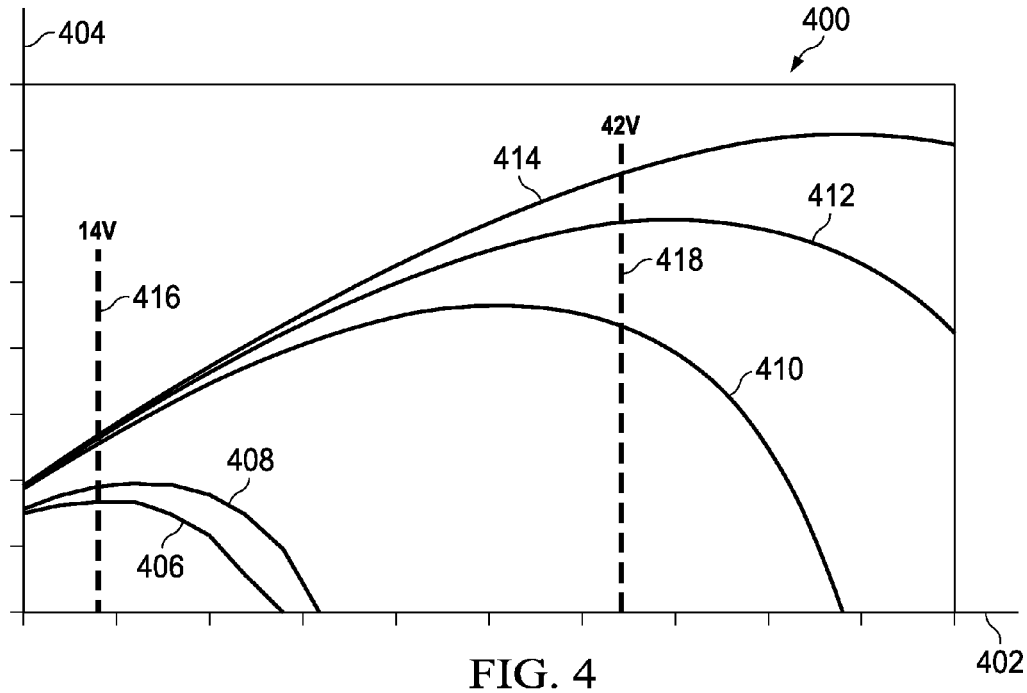
FIG. 4 illustrates an exemplary plot of an output voltage with an output power of an alternator of a charging and distribution system in accordance with an embodiment.

FIG. 4 illustrates an exemplary plot 400 of an output voltage (plotted on X-axis 402) with an output power (plotted on Y-axis 404) of an alternator, for example, the alternator 202 (see, e.g., FIG. 2) in accordance with an embodiment. In an exemplary embodiment, the variation 400 comprises or includes a plurality of curves, for example curves 406, 408, 410, 412, and 414, illustrating a variation of the output power with the output voltage at different speeds, for example at speeds of 1800 rpm, 2000 rpm, 3000 rpm, 4000 rpm, 6000 rpm, respectively of the alternator 202. In an exemplary scenario, the speed of, for example, 1500 rpm may correspond to an idle speed while the speed of, for example, 6000 rpm may correspond to a cruising speed. If the alternator, such as the alternator 202 (see, e.g., FIG. 2), is used at an operational output voltage of 14 V, then the output power capability across various speeds for example, corresponding to the alternator speeds 1500 rpm, 2000 rpm, 3000 rpm, and the like, may be represented by a vertical locus 416 intersecting the plurality of curves of the variation 400. Similarly, if the alternator is used at an operational output voltage of 42 V, the output power capability across various alternator speeds may be represented by a vertical locus 418 intersecting the plurality of curves of the variation 400.

As discussed with reference to FIG. 3, at low alternator/engine speeds, the power output of the alternator is only about one-third (⅓rd) to one-fifth (⅕th) of higher alternator speeds. For example, referring to the curve 406, the alternator 202 is configured to deliver a maximum power corresponding to the idle speed near the 14 V design voltage. However, at higher speeds (with same 14V output voltage), although the alternator delivers more power than that delivered at the lower speed (e.g., at the idle speed), the alternator does not achieve a peak output power thereof across the design voltage of 14V. For example, referring to the variations represented by the curves 408, 410, 412, and the like, at higher speeds (for instance, at speeds of 2000 rpm, 3000 rpm, 4000 rpm, and the like) and with 14 V output, the alternator delivers more power at higher speeds, but does not achieve the maximum possible output power across 14V output voltage. It is noted from the variation 400 that the alternator 202 can deliver more power at higher speeds if designed for higher output voltages. For example, referring to the curve 414, at 42 V output voltage and 6000 rpm, the alternator 202 can deliver a very high power. Also, as seen from the curve 406, one exemplary implementation provides that the alternator 202 is not to be used for a 42 V system, since at 42 V output and lower speeds the output power drops off rapidly, with little or no power generation at an idle speed. Accordingly, an alternator configured to generate sufficient power at the low speed, may not achieve the peak power capability thereof at higher speeds.

As discussed above, the three-phase alternators, for example the alternator 202 (see, e.g., FIG. 2) employ a diode bridge rectifier, such as, for example, the bridge rectifier 204, configured to rectify the generated AC output voltage. In the present embodiment, the output impedance of the alternator 202 is relatively high, due to which the maximum output power transfer can be achieved at a single output voltage at each speed, as seen from the curves 406-414. A diode rectifier, for example the diode rectifier 204, yields optimum load-matched power at a single speed only for example, the idle speed.

Various embodiments provide systems and methods for generating maximum power at relatively higher alternator speeds and relatively lower alternator speeds associated with vehicles, for example a two-wheeled vehicle. For example, in an embodiment, a switching regulator with a load-matching control is utilized such that the alternator output power can be maximized at all speeds. In an embodiment, the switching regulator may include a boost semi-bridge switched mode rectifier (SMR) for generating a maximum power output at relatively lower alternator speeds and a shunt regulator (or a sequential switching shunt regulator (SSSR)) for generating a maximum power output at relatively higher alternator speeds. The switching regulator and the load matching control thereof is explained in detail herein with reference to FIG. 5. Moreover, the operation of a charging and distribution control system with a switching regulator having the SMR, the SSSR and/or the shunt regulator is explained in detail herein with reference to FIGS. 5 through 11.

FIG. 5 illustrates an exemplary block diagram for a system 500 configured for charging and distribution control in a vehicle in accordance with an embodiment. In various embodiments, the system 500 is configured to facilitate the generation of maximum power output based on at least one alternator operational feature. In an embodiment, the at least one alternator operational feature comprises or includes an alternator output voltage. In an embodiment, the at least one alternator operational feature comprises or includes an alternator speed. In particular, the system 500 is configured to facilitate the generation of maximum power output for an entire speed range of the alternator. For example, the system 500 facilitates the generation of maximum power output both at relatively higher alternator speed range and relatively lower alternator speed range associated with vehicles. In an embodiment, the system 500 comprises or includes a switching regulator 502, a controller 504 and a first converter 506.

In an embodiment, the switching regulator 502 is coupled with an alternator, for example the alternator 202 (see, e.g., FIG. 2). As discussed with reference to FIG. 2, the alternator 202 is configured to generate an alternator output voltage, for example the alternator output voltage Vs. In the present embodiment, the alternator output voltage is represented as alternator output voltage 508. In various embodiments, the switching regulator 502 is configured to receive the output voltage $V_s$ from the alternator 202 and regulate the output voltage $V_s$ so as to generate a regulated output voltage Vo. In the present embodiment, the regulated output voltage Vo may be represented as the regulated output voltage 510. In various embodiments, the regulated output voltage 510 is capable of being utilized as operational DC bus voltage. In an embodiment, the operational DC bus voltage refers to a bus voltage that is provided to all the electrical circuits of a system, such as an electrical system of a vehicle.

In various embodiments, the switching regulator 502 is configured to facilitate the generation of maximum power output at all the levels of speed associated with the alternator 202. For example, the switching regulator 502 facilitates the generation of a maximum power output at relatively higher alternator speeds as well as relatively lower alternator speeds. In certain exemplary embodiments, the switching regulator 502 is configured to operate in a first operative state such that in the first operative state, the switching regulator 502 is configured to provide a maximum power output at relatively lower alternator speeds. In certain exemplary embodiments, the switching regulator 502 is configured to operate in a second operative state such that in the second operative state the switching regulator 502 is configured to provide a maximum power output at relatively higher alternator speeds. In various embodiments, the switching regulator 502 comprises or includes a boost semi-bridge switched mode rectifier (SMR) for operating the switching regulator 502 in the first operative state. The semi-bridge boost SMR comprises a semi-bridge rectifier having diodes and at least one first MOSFET. In the first operative state of the switching regulator, the boost semi-bridge SMR receives AC power through inductances associated with the alternator 202. The at least one first MOSFET can be controlled by the control circuit 504 to provide the regulated DC output voltage 510 based on a first duty ratio associated with the at least one first MOSFET. In various embodiments, the switching regulator 502 comprises or includes at least one of a shunt regulator and a sequential switching shunt regulator (SSSR) for operating the switching regulator 502 in the second operative state. The at least one of the shunt regulator and the SSSR comprises at least one second MOSFET. The at least one second MOSFET can be controlled by the control circuit to provide the regulated DC output voltage based on a second duty ratio associated with the at least one second MOSFET. In various embodiments, the operation of the switching regulator 502 in one of the first operative state and the second operative state is based on a control signal being generated by the control circuit 504. In particular, the control circuit 504 is coupled with an output terminal of the switching regulator 502 and is configured to perform a comparison associated with the alternator operational feature of the alternator 202. In an embodiment, the alternator operational feature is associated with a speed of the alternator 202 such that the control circuit 504 may perform a comparison of the speed of the alternator with a predetermined threshold speed. In another embodiment, the control circuit 504 may compare the alternator output voltage 508 with the operational DC bus voltage. Based on the comparison of the alternator speed with the predetermined threshold speed, or of the alternator output voltage with the operational DC bus voltage, the control circuit 504 generates the control signal to thereby trigger the operation of one of the boost semi-bridge SMR and at least one of the shunt regulator and the SSSR. For example, when the control circuit 504 determines the operational DC bus voltage to be greater than the alternator output voltage 508 of the alternator 202, then the control signal triggers the operation of the boost semi-bridge SMR. In one embodiment, when the control circuit 504 determines the speed of the alternator to be lower than the predetermined threshold speed associated with the alternator, then the control signal triggers the operation of the semi-bridge SMR. The boost semi-bridge SMR is configured to maximize the power transfer between the alternator 202 and the switching regulator 502 based on a load-matching condition between the alternator 202 and the switching regulator 502 at the relatively lower alternator speed. The maximization of power transfer between the alternator 202 and the switching regulator 502 based on the load matching condition, as well as a configuration of the boost semi-bridge SMR for the same, is discussed in detail herein with reference to FIG. 6.

In an embodiment, when the control circuit 504 determines an operational DC bus voltage to be lower than the alternator output voltage, then the control signal triggers the operation of the switching regulator 502 in the second operative state. In one embodiment, the control signal triggers the operation of the switching regulator 502 in the second operative state when the speed of the alternator 202 is determined to be greater than the predetermined threshold speed associated with the alternator 202. In the second operative state, the operation of at least one of the shunt regulator and the SSSR associated with the switching regulator 502 is triggered. In an embodiment, triggering the operation of the at least one of the shunt regulator and the SSSR is configured to maximize the power transfer between the alternator 202 and the switching regulator 502. In various embodiments, the SSSR is configured to maximize the power transfer between the alternator 202 and the switching regulator 502 based on a load-matching condition between the alternator 202 and the switching regulator 502 at the relatively higher alternator speeds. The maximization of power transfer between the alternator 202 and the switching regulator 502 based on the load matching condition, as well as a configuration of the SSSR and the shunt regulator for the same, is discussed in detail herein with reference to FIGS. 7A and 8. It is noted that various components of the switching regulator 502 may be provided together on a single chip or an integrated circuit. In some embodiments, however, the components of the boost semi-bridge SMR may be provided separately and wired to a control circuit, for example, the control circuit 504.

In certain embodiments, the regulated DC output voltage 510 may be provided to various components and loads of the vehicle. For example, the regulated DC output voltage 510 can be provided for a plurality of loads associated with the vehicle, such as high voltage loads and low voltage loads. As illustrated in FIG. 5, examples of the high voltage loads (represented as high voltage loads 512) may include, but are not limited to, a CDI unit, anti-lock braking system (ABS), electric braking, and the like. In various embodiments, the regulated DC output voltage 510 can be made available to a plurality of low voltage loads. In an embodiment, in order to provide power to the low voltage loads, the regulated DC output voltage 510 is stepped down. In an embodiment, the first converter 506 is configured to step down the regulated DC output voltage 510 so as to generate a low voltage DC output to provide power to the low voltage loads. In particular, the first converter 506 is coupled with the switching regulator 502 and configured to generate the low voltage DC output that is relatively lower than the output voltage 510. In an exemplary embodiment, the first converter 506 is a DC-DC converter. Examples of the low voltage loads (represented as low voltage loads 514) may include, but are not limited to, lamps, infotainment such as FM radio, a clock, a mobile phone charger port, a flasher, safety measurement devices, and the like.

In an embodiment, the low voltage DC output generated by the first converter 506 may be utilized to charge a battery, for example a battery 516 of the vehicle, with a constant level of current associated with the low voltage DC output. In various embodiments, the battery 516 is an example of the battery 108 explained herein with reference to FIG. 1. In various embodiments, the battery 516 may be a 12 V lead acid battery. In an embodiment, the battery 516 may be charged directly from the output power being derived from the alternator 202 rather than the first converter 506. For example, the system 500 may comprise or include a second converter that may convert the alternator output power into a DC power when a load on the system 500 is negligible or during no-load conditions. A system illustrating utilization of the second converter to derivate the charging current directly from the alternator for charging the battery 516, is illustrated and explained in detail with reference to FIG. 8. A detailed circuit diagram of an exemplary charging and distribution control system is explained herein with reference to FIG. 9.

FIG. 6 illustrates an exemplary circuit diagram of a charging and distribution control system 600 having a switching regulator operable in a first operative state in accordance with an embodiment. As illustrated in FIG. 6, the charging and distribution system control 600 (hereinafter referred to as system 600) is coupled with an alternator 602. In the present embodiment, the alternator 602 is similar to the alternator 202 (see, e.g., FIG. 3). For example, the stator winding and the rotor of the alternator 202 are similar to the stator winding and the rotor of the alternator 602, and, accordingly, the description thereof is omitted herein.

The system 600 comprises a switching regulator 604. In the present embodiment, the switching regulator 604 is a boost semi-bridge switched SMR; however, it is noted that the switching regulator 600 may include a different configuration for the switching regulator 604 for example, a full-bridge SMR. In the present embodiment, the boost semi-bridge SMR 600 is obtained by replacing the diodes, for example diodes 314, 318, and 322, in the bottom half of the bridge rectifier 204 (see, e.g., FIG. 3) with active devices/switches, such as power metal oxide semiconductor field effect transistors (MOSFETs). For example, the bottom half of the boost semi-bridge SMR 600 comprises MOSFETs 604, 606, 608 coupled in series with a number of diodes, for example, diodes 610, 612 and 614, respectively. In various embodiments, the switches, for example, the switches 604, 606, 608, may be modulated with an appropriate duty ratio so that the alternator output features can be matched to the output of the switching regulator 600 to thereby provide a maximum power capability to the alternator 602. As disclosed herein, the term 'duty ratio' of a switch for example a MOSFET, may refer to a ratio of an active or ON-time as a fraction of the total time period of the operation of the switch.

In various embodiments, the power transfer between the alternator 602 and the switching regulator 606 may be maximized by controlling the duty ratio of the switches 604, 606, 608 for a load-matching condition. For example, by selecting an appropriate value of the duty ratio for one or more switches, the output power of the alternator 602 can be controlled up to a maximum value that is a function of the alternator speed. In order to maximize the alternator efficiency over various load conditions, the switching regulator 600, for example the boost semi-bridge SMR can be controlled in a manner so that the alternator 602 may witness the largest effective voltage that can be used for that level of output power.

In an embodiment, in order to perform a regulation of the operational DC bus voltage, the MOSFETs or switches may be turned on and off (e.g., activated and deactivated, respectively) at a high frequency in a pulse-width modulation (PWM) manner with a first duty ratio d1. In particular, when a phase (for example, phase "a") is carrying a positive current, the MOSFET and the diode associated with the leg of that phase form a boost switch set and is switched on (or activated) for a specific duty cycle with a continuous conduction mode operation so that the diode is on (or operating) when the MOSFET is off (or inactive). The operation of turning on and thereafter turning off the MOSFETs is performed at a very high switching frequency in the PWM manner. Accordingly, the PWM operation causes the output voltage Vx of the switching regulator to be a pulsating waveform with an average value dependent on the alternator output voltage Vo and the first duty ratio 'd1'. An exemplary relationship between these factors can be expressed as follows:

$$Vx = (1-d1)Vo \qquad (1)$$

In an embodiment, the remaining legs of the boost semi-bridge SMR (e.g., the legs associated with phases b and c) carry the negative (return) current back to the alternator. In order to simplify the control strategy, all three ground referenced switches are switched on and off together with the duty ratio. Accordingly, at low alternator speeds, the boost semi-bridge SMR functions as a voltage booster on positive current polarity and provides one active phase at a time as well as some overlapping of phases. Accordingly, the system functions as a constant voltage source.

As discussed, by controlling the first duty ratio d1, the average voltage at the output of the bridge can be controlled and maintained at a value below the true output voltage of the alternator 202. By adjusting the first duty ratio d1, the alternator can generate up to its maximum power (across voltage) as speed varies while supplying a constant output voltage. Accordingly, in the present embodiment, by appropriately controlling the boost semi-bridge SMR duty ratio as a function of alternator speed, the power drawn at most of the speeds from the alternator is much higher than that achievable with a diode rectifier supplying a fixed output voltage. In an embodiment, the output power of an alternator with the boost semi-bridge SMR can be computed from the following expression:

$$P_o = \frac{\frac{3(1-d1)V_o}{\Pi}\sqrt{(k_1wk_2^2) - \left(2\frac{(1-d1)V_o}{\Pi}\right)^2}}{\omega L s} \qquad (2)$$

where,
Po is the alternator output power,
Ls is the synchronous inductance of the stator winding,
ω is the alternator angular electrical frequency,
k1 is the alternator output voltage constant,
k2 is the field constant, and
Vo is the regulated DC output voltage As disclosed herein, the alternator is configured to regulate the output voltage for load requirements from a zero power up to the maximum achievable power. The first duty ratio for achieving load matching with a boost semi-bridge SMR is given by the following equation:

$$(1-d1) = \left(\Pi k_1 \frac{\sqrt{2}}{4V_o}\right)\omega * k_2 \quad (3)$$

Based on equation (3), the alternator output voltage can be controlled from zero power up to the maximum load-matched power across an entire alternator speed range, for example for the first alternator speed range and the second speed range. It is noted that the first alternator speed range may refer, for example, to those alternator speeds wherein the alternator output voltage is lower than the rectified DC output voltage, while the second alternator speed range may refer, for example, to those alternator speeds wherein the alternator output voltage is greater than the rectified DC output voltage. In an embodiment, the variation of the first duty ratio may be performed by a control circuit that may be coupled with the switching regulator. The control circuit may be an example of the control circuit 504 described with reference to FIG. 5.

Figure 7A:
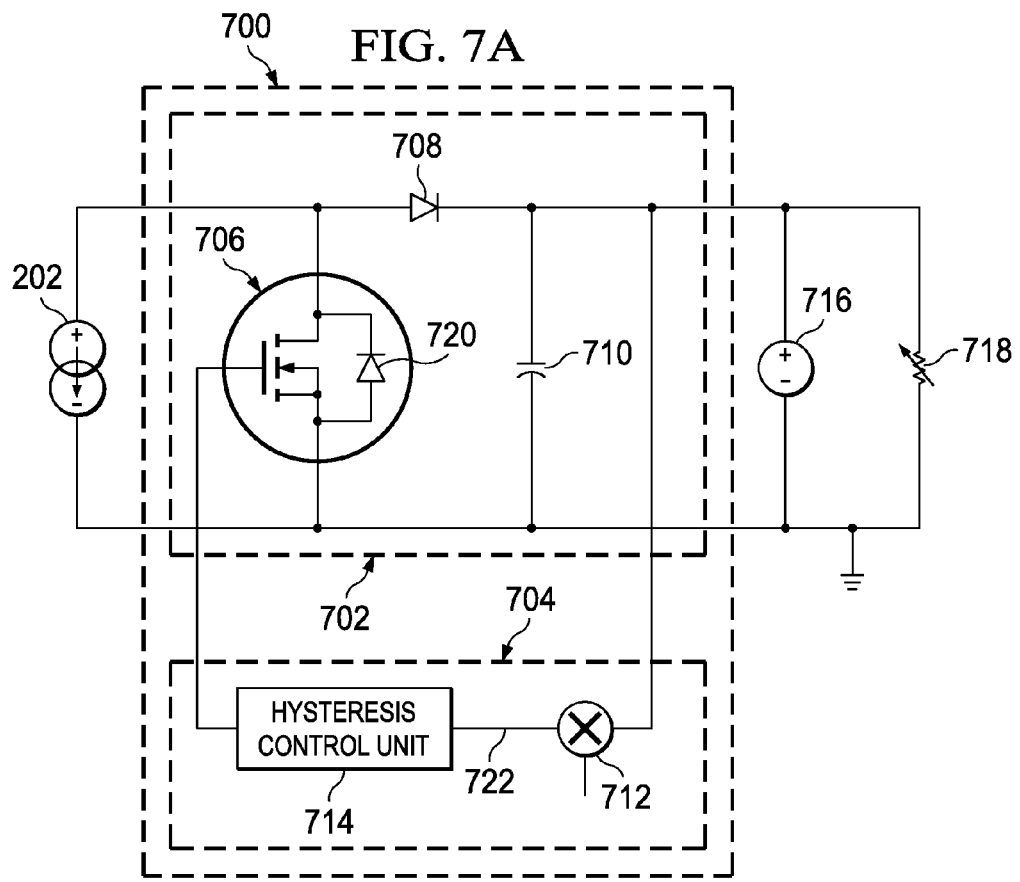
FIG. 7A illustrates an exemplary circuit diagram of a system configured for charging and distribution control and having a switching regulator operable in a second operative state in accordance with an embodiment.

FIG. 7A illustrates an exemplary circuit diagram of a system 700 configured for charging and distribution control and having a switching regulator operable in a second operative state in accordance with an embodiment. In an embodiment, the switching regulator is configured to be operable in the second operative state when an operational DC bus voltage is determined to be lower than an alternator output voltage. In another embodiment, the switching regulator is configured to be operable in the second operative state when an alternator speed is determined to be greater than a predetermined threshold speed. In an embodiment, the system 700 comprises or includes a switching regulator 702 and a control circuit 704. It is noted that the switching regulator 702 is an example of the switching regulator 502 (see, e.g., FIG. 5).

In an embodiment, in the second operative state of the switching regulator 702, at least one of a shunt regulator and a SSSR associated with the switching regulator 702 may be operative. For example, in one embodiment, the switching regulator 702 may comprise or include a shunt regulator coupled with the boost semi-bridge SMR, for example, the SMR 600 (see, e.g., FIG. 6), such that the DC rectified voltage output from the boost semi-bridge SMR is regulated. In another embodiment, the switching regulator 702 may comprise or include a SSSR, for example, a SSSR 706 coupled with each phase (e.g. phases a, b and c) of the alternator with a series diode. As illustrated in FIG. 7A, a single SSSR, for example the SSSR 706, is shown as being coupled with or connected to the alternator, for example, the alternator 202 (see, e.g., FIG. 2). It is noted, however, that for a three-phase alternator, one SSSR may be coupled with or connected to each of the three-phases, such that the three-phases may be sequentially switched.

In the present exemplary embodiment, the alternator 202 is represented as a current source. The switching regulator 702 comprises the SSSR 706, a diode 708, and a capacitor 710. The control circuit 704 comprises or includes an error amplifier 712 and a hysteresis control unit 714. As seen from FIG. 7A, the output voltage (represented as 716) of the switching regulator 702 may be measured or provided across the output terminals of the switching regulator 702. Moreover, the switching regulator 702 may be connected across a load, for example a load 718.

In an embodiment, the SSSR 706 is configured to regulate the operational DC bus voltage provided to a DC bus. In an embodiment, the SSSR 706 may be opened and closed based on a second duty ratio in order to regulate the operational DC bus voltage. In an exemplary embodiment, the SSSR 706 may be implemented by using a MOSFET having a body diode 720 (see, e.g., FIG. 7A). In an exemplary embodiment, the control circuit is configured to drive the second duty cycle of the SSSR 706 by performing the switching-on and switching-off of the MOSFET based on a level of the operational DC bus voltage.

In operation, the DC bus output voltage is input to the error amplifier 712, and an error signal 722 is generated. The error signal 722 is representative of the error in the DC bus. The error signal 722 is compared with a hysteresis band to thereby perform one of switching on or switching off of the SSSR 706. In an embodiment, the hysteresis band defines the switching frequency associated with the SSSR 706. A variation of an output voltage hysteresis regulation of the SSSR 706 is illustrated and explained further herein with reference to FIG. 7B.

In an embodiment, based on the hysteresis band, when the control circuit 704 (or the error signal 722 associated with the control circuit 704) determines the level of the operational DC bus voltage to be lower than the alternator output voltage, then the control circuit 704 opens the SSSR 706, thereby charging the capacitor 710 until the charge on the capacitor 710 reaches a high value of DC output voltage. In an embodiment, the SSSR 706 is shunted until the voltage across the capacitor 710 reaches a low value of operational DC bus voltage. In an embodiment, the control circuit 704 may perform the switching operation when the current associated with a phase (e.g. phase 'a') is positive. In various embodiments, the second duty cycle is controlled based on the load current requirements.

In various embodiments, the shunting switch 704 is switched on and off at a high frequency in a PWM manner with the second duty ratio d2. The PWM operation of the MOSFET causes the output current $i_o$ of the SSSR 706 to be dependent on the output current $i_s$ of the alternator 202 and the second duty ratio d2. Accordingly, the output current $i_o$ of the SSSR 706 may be given by the expression:

$$i_o = i_s(1-d2)$$

In various embodiments, the diode 708 is provided to avoid a closure of the SSSR 706. In particular, the diode 708 is coupled between the SSSR 706 and the bus and/or the load in a manner such that the power is able to flow from the alternator 202 to the bus/load, but not from the bus/load towards the alternator 202. In absence of the diode 708, the SSSR 706 may shunt the entire DC bus when closed.

Figure 7B:
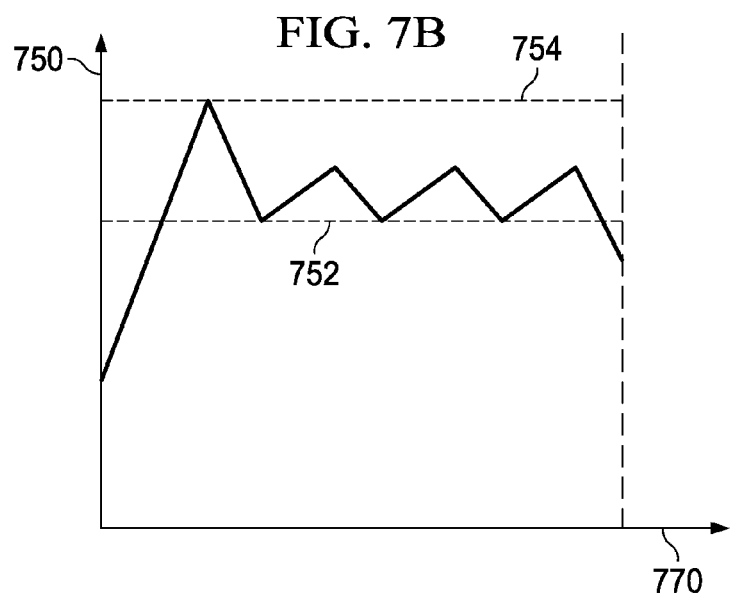
FIG. 7B illustrates an exemplary variation of an error signal associated with an operational DC bus voltage with time for the switching regulator of FIG. 7A in accordance with an embodiment.

FIG. 7B illustrates an exemplary variation of an error signal (plotted on Y-axis 750), for example the error signal 722 associated with the operational DC bus voltage with time (plotted on X-axis 770) for a SSSR, for example the SSSR 706 (see, e.g., FIG. 7A). As disclosed herein, the hysteresis may refer to, for example, a switching frequency of the SSSR 706. The hysteresis or the switching frequency is associated with a hysteresis band defined by a higher limit, for example, $V_{DChigh}$ and a lower limit, for example, $V_{DClow}$, such that the output DC bus voltage is regulated in the hysteresis band between $V_{DChigh}$ and $V_{DClow}$. For example, when the value of output DC bus voltage is determined to be equal to $V_{DClow}$, the SSSR 706 is opened to thereby charge the capacitor 710 (see, e.g., FIG. 7A) until the output DC bus voltage reaches $V_{DChigh}$. The SSSR 706 may be shunted until the time the voltage across the capacitor 710 reaches $V_{DClow}$. With reference still to FIG. 7B, the variation of the low voltage values (e.g., $V_{DClow}$) and the high voltage values (e.g., $V_{DChigh}$) of the error signal for a single SSSR are illustrated. For example, the SSSR may be operated between the low voltage values (for example, represented by 752) and the high voltage values (for example, represented by 752) of the error signal 722.

Figure 8:
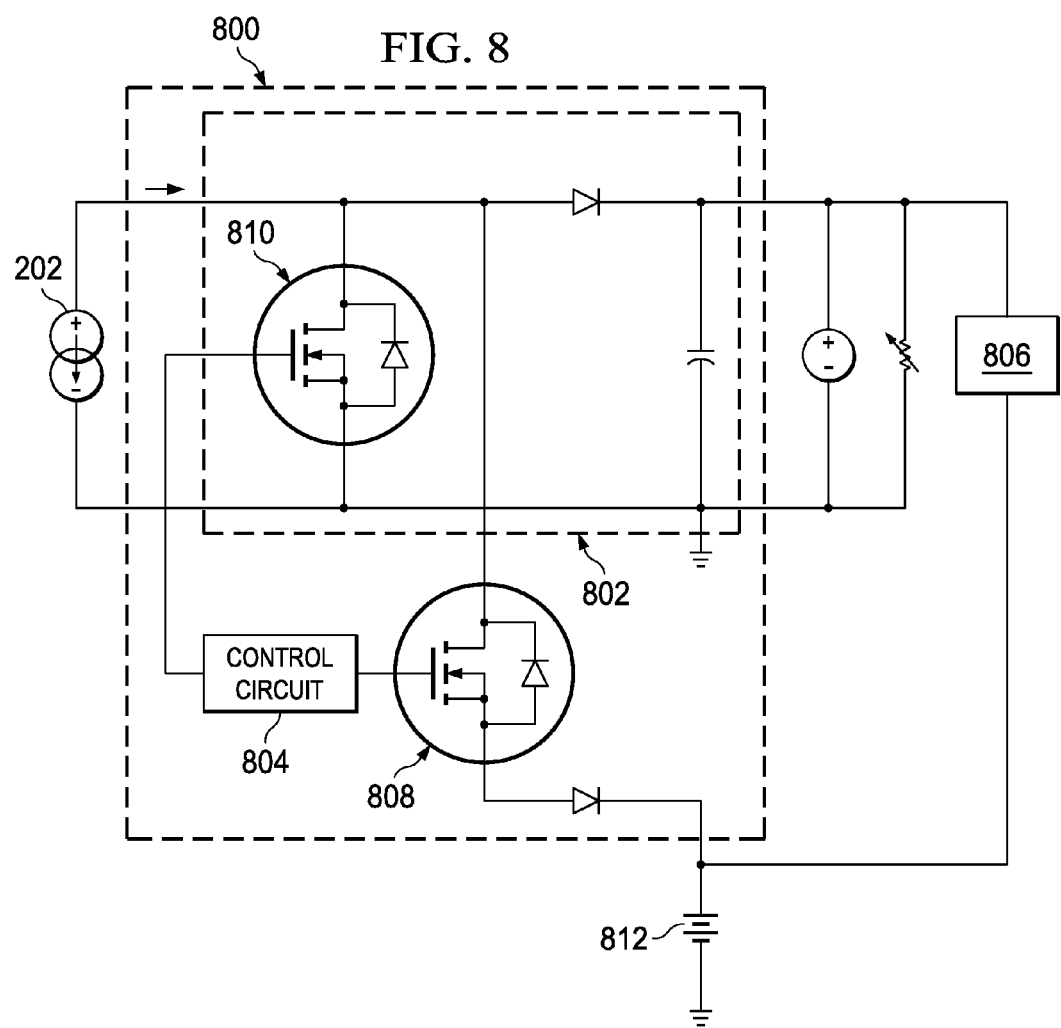
FIG. 8 illustrates exemplary circuit diagram of a system configured for charging and distribution control in accordance with an embodiment.

With reference now to FIG. 8, an exemplary circuit diagram of a system 800 configured for charging and distribution control in a vehicle in accordance with an embodiment is shown. The system 800 is configured to receive an alternator output voltage from an alternator, for example, the alternator 202 (see, e.g., FIG. 2). In the present embodiment, the alternator 202 is represented as a current source.

As illustrated in FIG. 8, the system 800 comprises a switching regulator 802, a control circuit 804, a first converter 806 and a second converter 808. In an embodiment, the switching regulator 802 is an example of the switching regulator 502 (see, e.g., FIG. 5). The switching regulator 802 is coupled with the control circuit 804. In the present embodiment, the switching regulator 802 comprises or includes a SSSR, for example, the SSSR 810. The SSSR 810 may be an example of the SSSR 704 (see, e.g., FIG. 7). In one embodiment, the control circuit 804 is an example of the control circuit 504 (see, e.g., FIG. 5).

As already discussed, the control circuit 504 is configured to compare the operational DC bus voltage and the alternator voltage output. Additionally, the control circuit 804 is configured to determine the power drawn from the alternator 202 based on the loads on the alternator 202. In the present embodiment, when the operational DC bus voltage is determined to be lower than the alternator voltage output, the control circuit 804 is configured to cut off the SSSR 810 (without shunting the SSSR 810), thereby providing an open circuit to the alternator output voltage. Also, since no significant amount of power is being drawn from the alternator 202, the alternator output voltage may be utilized to charge a battery, for example, the battery 812. The battery 812 may be an example of the battery 516 (see, e.g., FIG. 5). In an embodiment, in order to charge the battery 812, the alternator output voltage is provided to the second converter 808. In various embodiments, when the engine is running, the alternator 202 may be utilized to provide power to the loads, such as electrical loads. Also, the alternator 202 may be utilized to charge the battery 812. However, when the engine is not running, then electrical loads may be provided power from the battery 812. It is noted that, in this embodiment, when the DC bus does not have a high load demand, the second converter 808 is directly turned on to charge the battery 812, thereby facilitating a direct charging of the battery from the alternator 202 instead of the first converter 806. In various embodiments, utilization of the circuit disclosed herein offers the advantage of the engine power of the vehicle being (1) utilized effectively to charge the battery and (2) provided to the loads. Moreover, the life of the battery 812 is increased, since the charging-discharging cycles of the battery are reduced.

Figure 9:
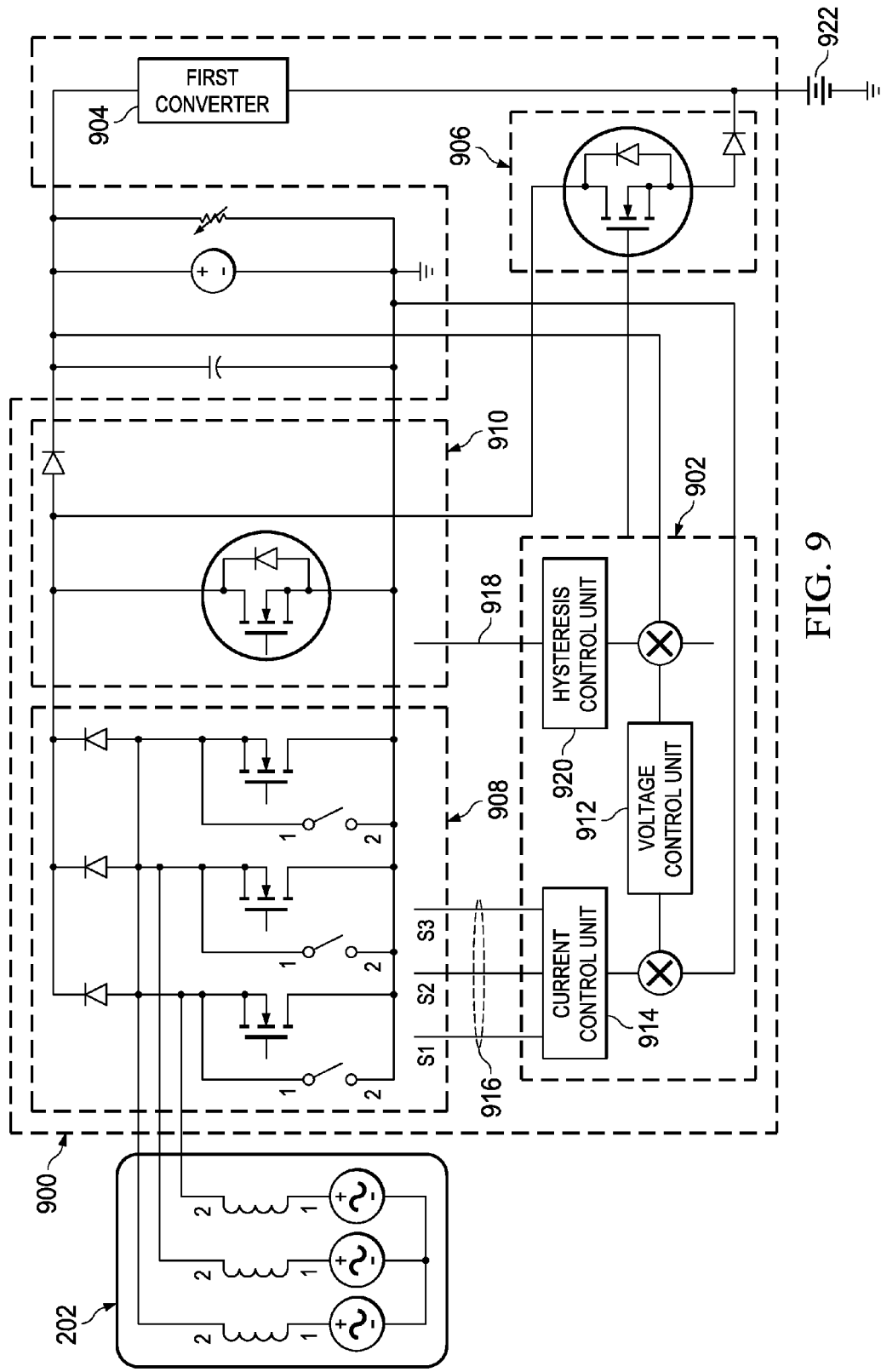
FIG. 9 illustrates an exemplary circuit diagram of a circuit diagram of a system configured for charging and distribution control in accordance with an embodiment.

FIG. 9 illustrates an exemplary circuit diagram of a system 900 configured for charging and distribution control in a vehicle in accordance with an embodiment. In particular, the system 900 is an example of the system 500 explained herein with reference to FIG. 5. The circuit 900 comprises a switching regulator, a control circuit 902, a first converter 904, and a second converter 906. The switching regulator comprises a boost semi-bridge SMR 908, and a SSSR 910. In an embodiment, the switching regulator is coupled with an alternator, for example the alternator 202 (see, e.g. FIG. 2). The alternator 202 is configured to generate an alternator output voltage, for example the output voltage Vs. In various embodiments, the switching regulator is configured to receive the alternator output voltage $V_s$ from the alternator 202, regulate the alternator output voltage $V_s$ and generate a regulated output voltage Vo.

As discussed herein with reference to FIG. 5, in certain exemplary embodiments, the switching regulator is configured to operate in a first operative state, such that in the first operative state the switching regulator is configured to provide a maximum power output at relatively lower alternator speeds. In the first operative state, an operation of a boost semi-bridge SMR, for example, the boost semi-bridge SMR 908 may be triggered. It is noted that the boost semi-bridge SMR 908 is an example of the boost semi-bridge SMR 600 explained herein with reference to FIG. 6. Accordingly, the components and functionalities thereof of the boost semi-bridge SMR 908 are similar to those of the boost semi-bridge SMR 600, respectively.

In certain exemplary embodiments, the switching regulator is configured to operate in the second operative state, such that in the second operative state, the switching regulator is configured to provide a maximum power output at relatively higher alternator speeds. In these embodiments, the switching regulator is configured to be operable in the second operative state. In the second operative state of the switching regulator, an operation of an SSSR, for example, the SSSR 910 may be triggered. It is noted that the SSSR 910 is an example of the SSSR 700 (see, e.g., FIG. 7A). Accordingly, the components and functionalities thereof of the SSSR 910 are similar to those of the SSSR 700, respectively.

Figure 10:
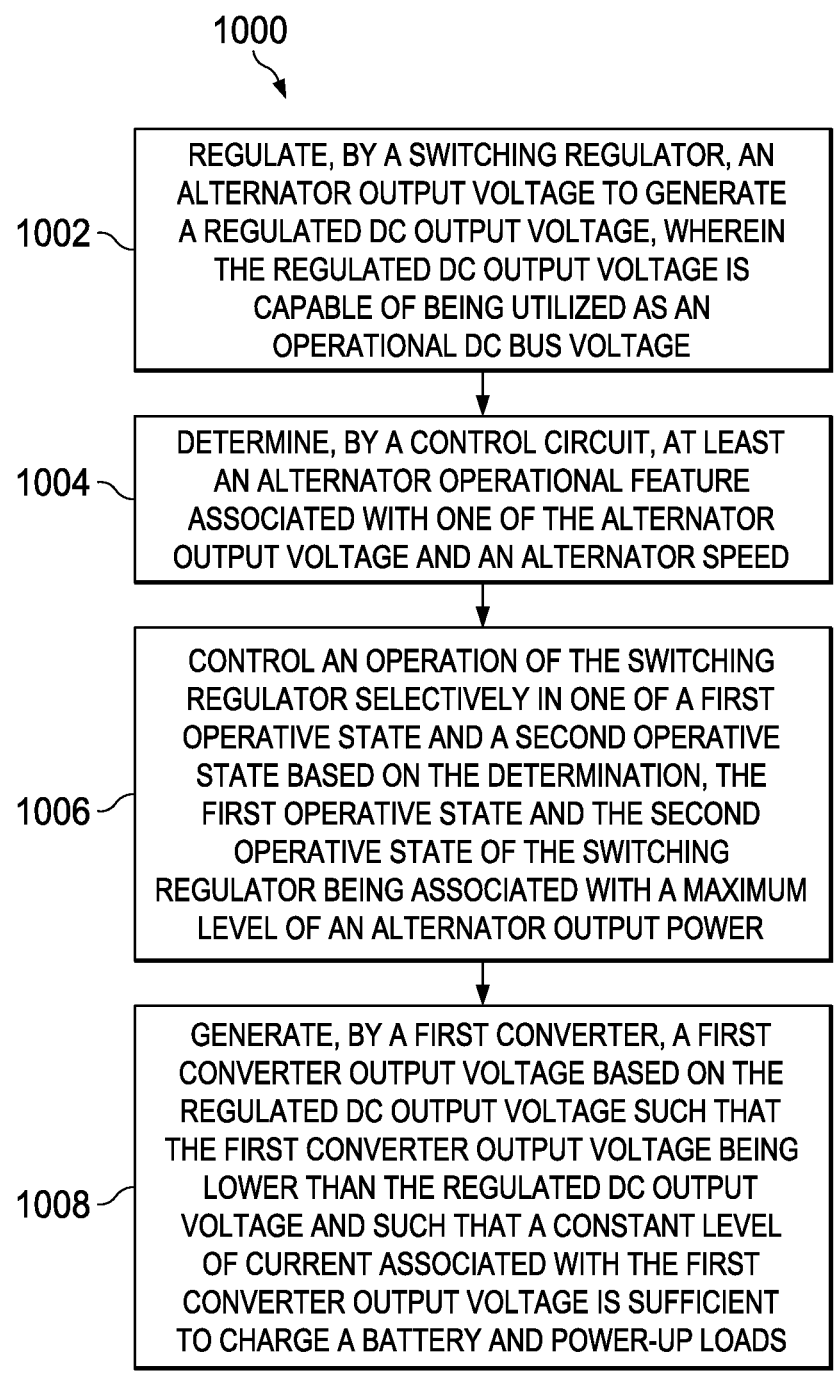
FIG. 10 is a flow diagram of a method of charging and distribution control in accordance with an embodiment.

As discussed herein with reference to FIGS. 5, 6 and 7A, the operation of the switching regulator in one of the first operative state and the second operative depends at least on a determination of an alternator operational feature of the alternator 202. In an embodiment, the operational feature of the alternator 202 may be associated with at least one of an alternator speed and the alternator output voltage. In an embodiment, the control circuit 902 is coupled with an output terminal of the SMR 908 and is configured receive the operational DC output voltage. For example, as illustrated in FIG. 10, the control circuit 902 receives the operational DC output voltage and compares the operational DC bus voltage with the alternator output voltage in order to generate an error signal. In another embodiment, the control circuit 902 compares the alternator speed with a predetermined threshold speed, and based on the comparison generates the error signal. In an embodiment, the predetermined threshold speed may be determined based on a number of poles associated with the alternator 202. The error signal may be processed by a voltage control unit, for example, a voltage control unit 912 and a current control unit 914 so as to determine the duty ratio to be implemented in order to regulate the operation DC bus voltage. In an embodiment, in response to this determination, the control circuit 902 is configured to generate a control signal, for example the control signal 916, which is configured to turn-on and turn-off the switches, for example, the switches of the boost semi-bridge SMR 908, in a PWM manner with a first duty ratio d1, thereby regulating the operational DC bus voltage. For instance, based on the determination performed by the voltage control unit 912 and the current control unit 914, the control circuit 902 triggers the operation of the switching regulator in the first operative state when the operational DC bus voltage is determined to be greater than the alternator output voltage. In another embodiment, the control circuit 902 triggers the operation of the switching regulator in the first operative state when the alternator speed is determined to be lower than the predetermined threshold speed of the alternator.

In the present embodiment, the control circuit 902 is configured to generate a control signal, for example the control signal 918, which is configured to turn-on and turn-off the switches, for example, the switches of the SSSR 910 in a PWM manner with a second duty ratio d2, thereby regulating the operational DC bus voltage. In the present embodiment, the operational DC bus voltage is regulated within a hysteresis band by utilizing a hysteresis control unit 920 embodied within the control circuit 902. In another embodiment, the control circuit 902 is configured to generate a control signal for turning-on and turning-off the switches associated with a shunt regulator coupled with the SMR. The switches associated with the shunt regulator may turn-on or turn-off in a PWM manner with the second duty ratio d2, thereby regulating the operational DC bus voltage. The shunt regulator is explained in more detail with reference to FIG. 11.

The first converter 904 is coupled with the switching regulator and configured to generate a converter output voltage based on the regulated DC output voltage. In an embodiment, the first converter 904 is an example of the converter 506 (see, e.g., FIG. 5). In an embodiment, the first converter 904 is a synchronous DC-DC buck converter. The converter output voltage is relatively lower than the regulated DC output voltage. In an embodiment, the converter output voltage is sufficient to charge a battery, for example a battery 922, with a constant level of current associated with the converter output voltage.

In one embodiment, the charging of the battery 922 may be performed directly based on a series regulation of the current drawn directly from part of the SSSR 910 (or the shunt regulator) that is controlling the output DC voltage. For example, when it is determined by the control circuit 902 that the operational DC bus voltage is lower than the alternator output voltage, and when the loading of the bus is relatively low, then the control circuit 902 cuts off or deactivates the SSSR 910 (without shunting the SSSR 910), thereby providing an open circuit to the alternator output voltage. In the present embodiment, due to the open circuit of the SSSR 910, no significant degree of power is being drawn from the alternator 202, and, accordingly, the alternator output voltage may be utilized to charge the battery, for example the battery 922. In an embodiment, in order to charge the battery 922, the alternator output voltage is provided to the second converter 906. In various embodiments, when the engine is running, the alternator 202 may be utilized to provide power to the loads, such as electrical loads. Also, the alternator 202 may be utilized to charge the battery 922. However, when the engine is not running, then electrical loads may be provided power from the battery 922, thereby facilitating an effective utilization of the engine power and increasing the life of the battery.

FIG. 10 is a flow diagram of a method 1000 of charging and distribution control according to an embodiment. In an embodiment, the method 1000 of charging and distribution control includes determining alternator operational features of an alternator, and based on the determination, controlling an operation of a switching regulator coupled with the alternator, to thereby regulate the output voltage of the switching regulator. In certain embodiments, operations of method 1000 are performed by a circuit, for example, the circuit 500, configured for charging and distribution control (see, e.g., FIG. 5).

At 1002, the method 1000 includes receiving, by a switching regulator, an alternator output voltage so as to generate a regulated DC output voltage. In various embodiments, the switching regulator is coupled with an alternator and configured to receive an alternator output power. The regulated DC output voltage is utilized as an operational DC bus voltage. An example of the switching regulator is the switching regulator 502 (see, e.g., FIG. 5). In an embodiment, the switching regulator includes or comprises a boost semi-bridge SMR and one of a SSSR and a shunt regulator. Exemplary circuits of the boost semi-bridge SMR and the SSSR are described herein with reference to FIGS. 6 and 7A, respectively. As discussed with reference to FIGS. 6 and 7, in an embodiment, the boost semi-bridge SMR comprises at least one first MOSFET. Also, in an embodiment, the SSSR comprises at least one second MOSFET.

At 1004, at least one alternator operational feature associated with one of the alternator output voltage and an alternator speed is determined. In an embodiment, the alternator output voltage may be determined by a voltage detection unit. The alternator output voltage is compared with the operation DC bus voltage by a control circuit. In an embodiment, the control circuit is coupled with the switching regulator. An example of the switching regulator is the switching regulator 504 (see, e.g., FIG. 5). In an embodiment, the alternator output voltage may be determined to be higher than the operational DC bus voltage based on the comparison. In alternate embodiments, based on the comparison, the alternator output voltage may be determined to be lower than (or nearly equal to) the operation DC bus voltage.

In an embodiment, the alternator speed may be determined by means of a speed sensor interface circuit that may be configured to facilitate a determination of a speed information associated with the alternator speed, and provide the speed information to the control circuit. The alternator speed is compared with a predetermined threshold speed. In an embodiment, the predetermined threshold speed of the alternator may be determined based on a number of poles of the alternator.

At 1006, an operation of the switching regulator is selectively controlled in one of a first operative state and a second operative state based on the comparison. In an embodiment, the first operative state and the second operative state of the switching regulator are associated with a maximum level of the alternator output power corresponding to the alternation operational characteristic. In an embodiment, controlling the operation of the switching regulator in the first operative state includes or comprises triggering operation of the SMR associated with the switching regulator upon a determination that the operational DC bus voltage is greater than the alternator output voltage. In an embodiment, the operation of the SMR is triggered by generating the regulated DC output voltage based at least on a first duty ratio associated with at least one first MOSFET associated with the SMR. In an embodiment, the SMR is a boost semi bridge SMR (as discussed with reference to FIG. 6). The operation of the switching regulator in the first operative state is explained herein in detail with reference to FIG. 6.

In an embodiment, controlling the operation of the switching regulator in the second operative state includes or comprises triggering operation of one of a SSSR and a shunt regulator associated with the switching regulator upon a determination that the operational DC bus voltage is lower than the alternator output voltage. In an embodiment, the operation of one of the SSSR and the shunt regulator is triggered by generating the regulated DC output voltage based at least on a second duty ratio associated with at least one second MOSFET associated with the one of the shunt regulator and the SSSR. The operation of the switching regulator in the second operative state is explained herein in detail with reference to FIG. 7A.

At 1008, a first converter output voltage is generated based on the regulated DC output voltage. In an embodiment, the first converter output voltage is generated by a first converter. An example of the converter is the converter 506 (see, e.g., FIG. 5). In an embodiment, the first converter output voltage is relatively lower than the regulated DC output voltage. The first converter output voltage is utilized to charge a battery with a constant level of current associated with the first converter output voltage. An example of the battery is the battery 516 (see, e.g., FIG. 5).

Figure 11:
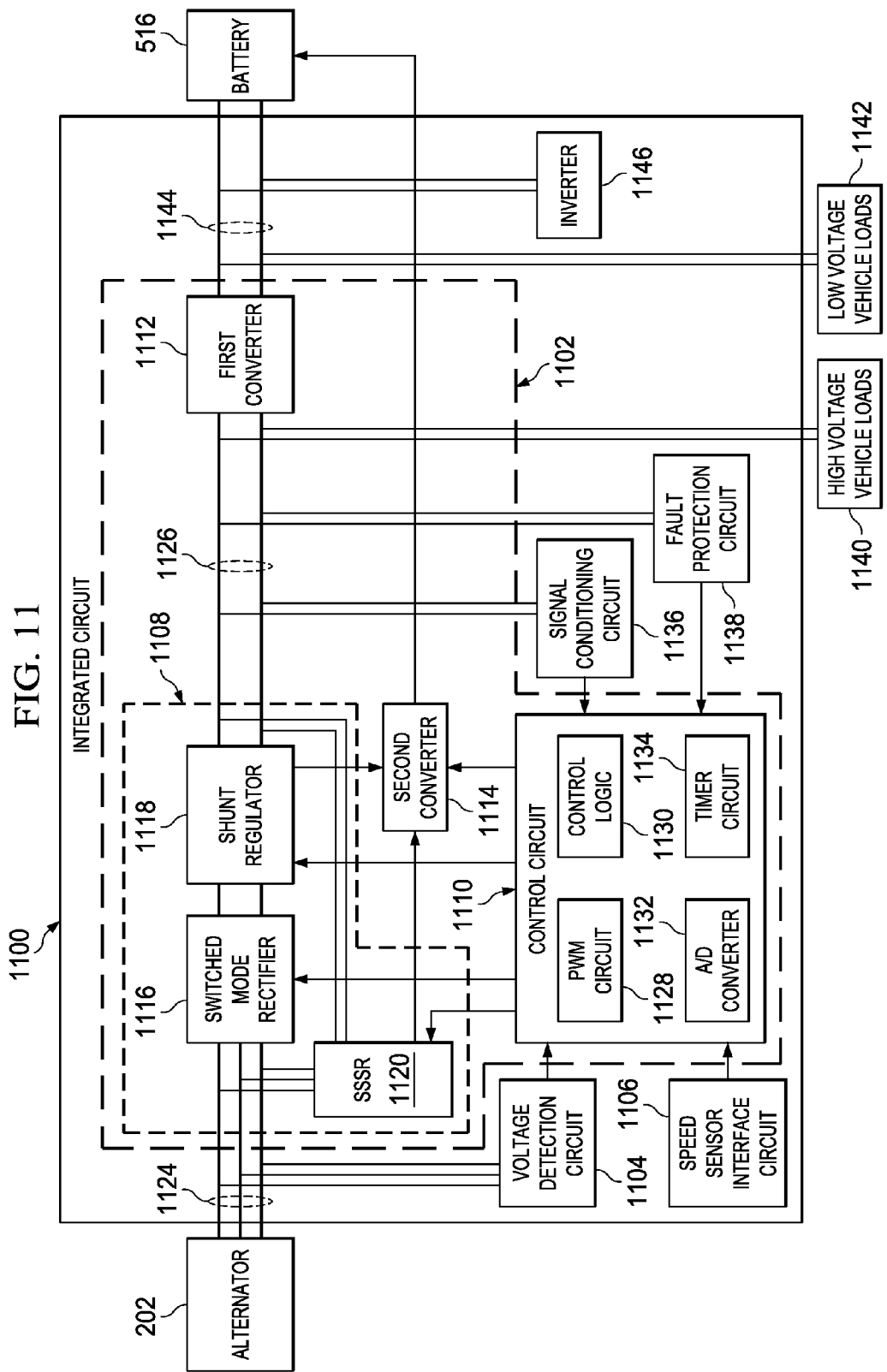
FIG. 11 is a block diagram of an exemplary integrated circuit (IC) incorporating a charging and distribution control circuit in accordance with an embodiment.

FIG. 11 is a block diagram for an IC 1100 incorporating the charging and distribution control circuit 900 of FIG. 9 in accordance with an embodiment. As depicted in FIG. 11, the IC 1100 includes or comprises a charging and distribution system, for example, a charging and distribution control system 1102, a voltage detection circuit 1104 and a speed sensor interface circuit 1106.

The charging and distribution control system 1102 is coupled with an alternator, for example, the alternator 202 (see, e.g., FIG. 2) and is configured to provide a regulated bus voltage for a range of speed associated with an alternator 202. The charging and distribution control system 1102 comprises or includes a switching regulator 1108, a control circuit 1110, a first converter 1112 and a second converter 1114. The switching regulator 1108 is an example of the switching regulator 502 as explained with reference to FIG. 5. The switching regulator 1108 includes or comprises a switched mode rectifier 1116, a shunt regulator 1118, and a SSSR 1120. In an embodiment, the switched mode rectifier 1116 comprises or includes a boost three-phase semi-bridge SMR. A circuit describing components of the boost three-phase semi-bridge SMR and functionalities thereof is explained herein with reference to FIG. 6. In an embodiment, the shunt regulator 1118 is coupled with the SMR 1116 and the control circuit 1110. In an embodiment, the SSSR 1120 is coupled with the alternator 202. It is noted that one SSSR may be coupled in each of the three phases of the alternator, however for the sake of brevity of description only a single SS SR is illustrated in FIG. 11. A circuit describing components of the SSSR and functionalities thereof is explained herein with reference to FIG. 7A. It is noted that in FIG. 7A a single-phase SSSR is explained, however it will be contemplated that the system 1100 may include a three-phase SSSR instead of the single-phase SSSR. Moreover, various components and the functional description thereof for a three-phase SSSR is similar to that of the single-phase SSSR.

In an embodiment, the switching regulator 1108 is configured to receive an alternator output voltage, for example, the alternator output voltage 1124 and generate a regulated output voltage which may be provided for the operational DC bus voltage 1126. In an embodiment, the switching regulator 1108 is coupled with the control circuit 1110. The control circuit 1110 is configured to selectively control the operation of the switching regulator 1108 in one of the first operative state and the second operative state. For example, the control circuit 1110 is configured to determine the operational DC bus voltage and compare the same with the alternator output voltage 1124. In an embodiment, the control circuit 1110 is coupled with the voltage detection circuit 1104. The voltage detection circuit 1104 is coupled with the alternator 202 and is configured to detect the alternator output voltage 1124. For example, the voltage detection circuit 1104 may determine a positive cycle and a negative cycle operation of the alternator output voltage which may be utilized to turn on respective MOSFETs in the boost semi-bridge three phase SMR and/or the SSSR based on positive current cycle.

In another embodiment, the control circuit 1110 is configured to compare the alternator speed with a predetermined threshold speed of the alternator 202. When the alternator speed is determined to be lower than the predetermined threshold speed, the control circuit 1110 triggers the operation of the switching regulator in the first operative state, thereby triggering the operation of the boost semi-bridge three phase SMR. Alternatively, when the alternator speed is determined to be higher than the predetermined threshold speed, the control circuit 1110 triggers the operation of the switching regulator, in the second operative state, thereby triggering the operation of the shunt regulator 1118 and the SSSR 1120. In an embodiment, the predetermined threshold speed may be determined based on a number of poles of the alternator. In an embodiment, the speed sensor interface circuit 1106 is coupled with the alternator and the control circuit 1110, and is configured to facilitate determination of a speed information of the alternator, and provide the speed information to the control circuit 1110.

Based on said comparison, the control circuit 1110 is configured to trigger the operation of one of the switched mode rectifier 1116, the shunt regulator 1118 and the SSSR 1120, to thereby facilitate the operation of the switching regulator 1108 in one of the first operative state and the second operative state, respectively.

In an embodiment, the control circuit comprises or includes one or more components and/or circuits that may be configured to facilitate the operation of control circuit. For example, the control circuit 1110 may include components/circuits, such as a PWM circuit 1128 that may be configured to facilitate in adjusting the first duty ratio and/or the second duty ratio associated with the switched mode rectifier 1116 and the shunt regulator 1118, respectively. In certain embodiments, the control circuit 1110 may include a control logic unit 1130 that may be configured to determine the operative state of the switching regulator. In various embodiments, the control circuit 1110 may include components/circuits for example, an analog to digital converter 1132, a timer circuit 1134, and the like that may facilitate in efficient operation of the system 1100.

In an embodiment, the IC 1100 comprises or includes fault diagnostic systems for determining fault in the vehicle. For example, the IC 1100 may comprise or include a signal conditioning circuit 1136 and a fault protection circuit 1138. In an embodiment, the signal conditioning circuit is coupled with the control circuit 1110 and configured to receive the regulated DC voltage output from the DC bus, and DC current. The signal conditioning circuit 1136 is further configured to eliminate any ringing or noise which may occur during the generation of the regulated output voltage such as, due to high speed high current switching of the system 1108 and from alternator 202, and produce a conditioned voltage. In an embodiment, the fault protection circuit 1138 is coupled with the control circuit 1110 and configured to detect and eliminate any ground faults in the system 1100. For example, the fault protection circuit is configured to detect and correct the faults such as load dump, and conditions like jump start and battery shorting which usually occur in automotive vehicles. During faults like load dump/over voltage conditions, the control circuit functions to adjust the duty ratio of SMR/SSSR/shunt regulator to limit the alternator output voltage. Fault protection circuit is to increase the reliability of complete system for all kind of generic automotive faults.

In an embodiment, the regulated DC output voltage 1120 may be provided to a plurality of electrical loads associated with the vehicle. Examples of electrical loads associated with the vehicle may include but are not limited to loads high voltage vehicle loads 1140 such as CDI unit, anti-lock braking system (ABS), electric braking, and the like; and low voltage vehicle loads 1142 such as lamps, infotainment such as FM radio, clock, mobile phone charger port, flasher, safety measurement, and the like.

In an embodiment, the regulated DC output voltage 1126 is input to the first converter 1112. The first converter 1112 is configured to generate a first converter output voltage 1144 based on the regulated DC output voltage 1126. In an embodiment, the converter 1112 is a synchronous DC-DC buck converter. In various embodiments, the first converter output voltage 1144 is relatively lower than the regulated DC output voltage 1126. For example, the synchronous DC-DC buck converter is configured to generate a regulated DC bus voltage of 14V. In an embodiment, the converter output voltage 1138 is utilized to charge a battery, for example the battery 516 (see, e.g. FIG. 5) with a constant level of current associated with the first converter output voltage 1144.

In some exemplary embodiments, the regulated DC bus voltage may be utilized for operating AC loads. For example, the IC 1100 may include an inverter such as inverter 1146 coupled configured to receive the first converter output voltage 1144 which is the regulated DC bus voltage. Said first converter output voltage 1144 may be input to the inverter 1146 for converting the first converter output voltage 1144 into an AC voltage (at lower voltages) for supplying to low voltage AC loads.

In an embodiment, the second converter 1114 is coupled with the control circuit 1110, the shunt regulator 1118, and the SSSR 1120. The second converter 1114 is configured to generate a constant level of second converter current to charge the battery 516 based at least on the determination of the alternator operational feature and an alternator load by the control circuit 1110. For example, when it is determined that the operational DC bus voltage is lower than the alternator output voltage, and when the loading of the bus is relatively low, then the control circuit 1110 cuts off or deactivates the SSSR 1120 or the shunt regulator 1118 (without shunting the SSSR 1120 or the shunt regulator 1118), thereby providing an open circuit to the alternator output voltage. In the present embodiment, due to the open circuit of the SSSR 1120 (or the shunt regulator 1118), no significant degree of power is being drawn from the alternator 202, and, accordingly, the alternator output voltage may be utilized to charge the battery, for example the battery 516.

It is noted that only a few embodiments have been described herein in detail, and it is noted that various other embodiments may be implemented in many other forms. For example, the present disclosure contemplates a wide variety of ICs that can each contain almost any combination of features described herein and be formed using any number of processors and microcontrollers. For instance, with reference to FIG. 11, the IC 1100 is described to comprise or include the elements of the charging and distribution control unit along with other elements such as voltage detection circuit, speed sensor interface circuit and the like on a single IC. However, for the purpose of implementation and otherwise, said components may be made available on different/distinct ICs and electrically and/or communicatively coupled together to achieve the charging and distribution control. Accordingly, the present embodiments should be considered illustrative and not restrictive.

As described above, the systems, devices (e.g., apparatuses) and methods of the present disclosure include solutions for providing charging and distribution control in various applications, such as vehicle systems. It is noted, therefore, that the present disclosure discloses several features that enable the operation of the vehicle electrical systems in an efficient manner. Additionally, the disclosed techniques facilitate reduction of variation in attenuation profile across process corners and temperature variation.

Various disclosed systems include an architecture for effective utilization of alternator power output at all speeds, for example, in a vehicle. The disclosed architecture/systems ensure a reduction in size of the alternator, thereby facilitating effective saving in copper. Moreover, the architecture/system provides a low cost and energy saving solution for vehicle electrical systems. In an embodiment, the disclosed systems/architecture provides a stable 14V DC voltage output, that is protected against load dump conditions and similar variable high voltage fast transients, thereby allowing the hardware requirements and design of electronic control units (ECU) to be simplified and lead to an ECU cost reduction. As used herein, the 'load dump' refers to a condition in the electrical systems wherein a large load is suddenly disconnected from the system, thereby leading to the generation of large transients in the electrical systems. The load dump condition is harmful for the vehicle electrical systems since the large transient voltage resulting due to the load dump condition may damage the electrical loads of the vehicle. However, in the present disclosure, the regulation of alternator output voltage to generate the regulated DC bus voltage facilitates in addressing a constant bus, thereby avoiding load dump conditions. Typically, in order to deal with the load dump conditions, the electrical systems in the vehicles are provided with electronic components such as high power or high energy transient voltage clamp suppressors. However, since in the present disclosure the load dump condition can be avoided, the additional electronic components can be precluded from the system design, thereby saving the cost incurred on said electronic components.

In an embodiment, the disclosed system and methods may provide an improvement of efficiency in the electrical power generation by about 30-40 percent. Moreover, as discussed with reference to FIG. 8, due to effective utilization of power and power management of battery, the fuel efficiency can be increased. Further, due to controlled charging and effective power delivery onto bus from the alternator when vehicle is running (which will reduce the usage of battery power) may facilitate in increasing the battery life. In various embodiments, the disclosed systems are configured to provide a regulated DC output for higher power outputs, thereby decreasing an effective size of the alternator for the same output power. In certain embodiments, the system provides health monitoring of power net and optimization of power connector and wiring for lower current handling.

As disclosed herein, the disclosed systems and methods allow utilization of an entire speed range and power output in the entire speed range, for example the higher speed range and the lower speed range of the engine/alternator. Also, the methods and systems provides a highly efficient technique for charging and distribution with built-in protection features and centralized control of the transients on the DC bus used for powering loads or charging batteries.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system for charging and distribution control comprising:
    a switching regulator configured to regulate an alternator output voltage of an alternator and generate a regulated DC output voltage, the regulated DC output voltage capable of being utilized as an operational DC bus voltage, the switching regulator further configured to selectively operate in one of a first operative state and a second operative state based on a control signal, the first operative state and the second operative state being associated with a maximum level of an alternator output power corresponding to at least one alternator operational feature, at least one alternator operational feature being associated with the alternator output voltage and an alternator speed;
    a control circuit coupled with the switching regulator and configured to generate the control signal for selectively controlling the operation of the switching regulator in one of the first operative state and the second operative state based on the at least one alternator operational feature; and
    a first converter coupled with the switching regulator and configured to generate a first converter output voltage based on the regulated DC output voltage, such that the first converter output voltage is lower than the regulated DC output voltage, and such that a constant level of current associated with the first converter output voltage is sufficient to charge a battery and distribute power to loads, wherein the switching regulator comprises:
    a boost semi-bridge switched mode rectifier (SMR), the boost semi-bridge SMR comprising at least one first metal oxide semiconductor field effect transistor (MOSFET), and
    at least one of a shunt regulator and a sequential switching shunt regulator (SSSR), the shunt regulator coupled with the boost semi-bridge SMR and the SSSR capable of being coupled with the alternator, the at least one of the shunt regulator and the SSSR comprising at least one second MOSFET.

2. The system of claim 1, wherein during the first operative state of the switching regulator, the control signal is configured to trigger an operation of the boost semi-bridge SMR, and, during the second operative state of the switching regulator, the control circuit is configured to trigger an operation of one of the shunt regulator and the SSSR.

3. The system of claim 2, wherein triggering the operation of the boost semi-bridge SMR comprises generating the regulated DC output voltage based at least on a first duty ratio associated with the at least one first MOSFET.

4. The system of claim 3, wherein triggering the operation of one of the SSSR and the shunt regulator comprises generating the regulated DC output voltage based at least on a second duty ratio associated with the at least one second MOSFET.

5. The system of claim 1, wherein generating the control signal based on the alternator output voltage comprises comparing the alternator output voltage with the operational DC bus voltage, and wherein generating the control signal based on the alternator speed comprises comparing the alternator speed with a predetermined threshold speed.

6. The system of claim 5, wherein the control circuit is configured to trigger the operation of the boost semi-bridge SMR in the first operative state upon a determination of at least one of:
    the alternator output voltage being lower than the operational DC bus voltage, and
    the alternator speed being lower than the predetermined threshold speed.

7. The system of claim 5, wherein the control circuit is configured to trigger the operation of one of the SSSR and the shunt regulator in the second operative state upon a determination of at least one of:
    the alternator output voltage being greater than the operational DC bus voltage, and
    the alternator speed being greater than the predetermined threshold speed.

8. The system of claim 1 further comprising:
    a voltage detection circuit coupled with the alternator and the control circuit, the voltage detection circuit configured to determine a value of the alternator output voltage and provide the value to the alternator output voltage to the control circuit for facilitating the control circuit to control the operation of the switching regulator in one of the first operative state and the second operative state.

9. The system of claim 1 further comprising:
    a speed sensor interface circuit coupled with the alternator and the control circuit, the speed sensor interface circuit configured to facilitate a determination of a speed information associated with the alternator speed, the speed sensor interface circuit further configured to provide the speed information to the control circuit.

10. The system of claim 1, wherein the switching regulator further comprises a second converter coupled with the control circuit and at least one of the SSSR and the shunt regulator, the second converter configured to generate a constant level of second converter current to charge the battery based at least on a determination of the alternator operational feature and the loads by the control circuit.

11. A method of charging and distribution control, the method comprising:
    regulating, by a switching regulator, an alternator output voltage so as to generate a regulated DC output voltage capable of being utilized as an operational DC bus voltage;
    determining, by a control circuit, at least one alternator operational feature, the at least one alternator operational feature being associated with the alternator output voltage and an alternator speed;
    controlling, by the control circuit, an operation of the switching regulator selectively in one of a first operative state and a second operative state based on the determination, the first operative state and the second operative state being associated with a maximum level of the alternator output power corresponding to the alternator operational feature; and generating, by a first converter, a first converter output voltage based on the regulated DC output voltage, such that the first converter output voltage is lower than the regulated DC output voltage and such that a constant level of current associated with the first converter output voltage is sufficient to charge a battery and distribute power to loads, wherein controlling the operation of the switching regulator in the first operative state comprises triggering an operation of a boost semi-bridge switched mode rectifier (SMR) associated with the switching regulator upon determination of at least one of:

the alternator output voltage being lower than the operational DC bus voltage, and the alternator speed being lower than a predetermined threshold speed associated with the alternator, wherein triggering the operation of the boost semi-bridge SMR comprises generating the regulated DC output voltage based at least on a first duty ratio associated with at least one first MOSFET associated with the boost semi-bridge SMR.

12. The method of claim 11, wherein controlling the operation of the switching regulator in the second operative state comprises triggering an operation of one of a SSSR and a shunt regulator associated with the switching regulator upon determination of at least one of:

the alternator output voltage being greater than the operational DC bus voltage, and the alternator speed being greater than a predetermined threshold speed associated with the alternator, wherein triggering the operation of one of the SSSR and the shunt regulator comprises generating the regulated DC output voltage based at least on a second duty ratio associated with at least one second MOSFET, the at least one second MOSFET being associated with the at least one of the SSSR and the shunt regulator.

13. An integrated circuit (IC) configured for charging and distribution control, the IC comprising:

a charging and distribution control system comprising:

a switching regulator configured to regulate an alternator output voltage of an alternator and generate a regulated DC output voltage, the regulated DC output voltage capable of being utilized as an operational DC bus voltage, the switching regulator further configured to selectively operate in one of a first operative state and a second operative state based on a control signal, the first operative state and the second operative state being associated with a maximum level of an alternator output power corresponding to at least one alternator operational feature, at least one alternator operational feature being associated with the alternator output voltage and an alternator speed, a control circuit coupled with the switching regulator and configured to generate the control signal for selectively controlling the operation of the switching regulator in one of the first operative state and the second operative state based on the at least one alternator operational feature, and a first converter coupled with the switching regulator and configured to generate a converter output voltage based on the regulated DC output voltage, such that the first converter output voltage is lower than the regulated DC output voltage, and such that a constant level of current associated with the first converter output voltage is sufficient to charge a battery and distribute power to loads;

a voltage detection circuit coupled with the alternator and the control circuit, the voltage detection circuit configured to determine a value of the alternator output voltage, and provide the value to the control circuit for facilitating the control circuit to control the operation of the switching regulator in one of the first operative state and the second operative state; and a speed sensor interface circuit coupled with the alternator and the control circuit, the speed sensor interface circuit configured to facilitate a determination of a speed information associated with the alternator speed, the speed sensor interface circuit further configured to provide the speed information to the control circuit, wherein the switching regulator comprises:

a boost bridge SMR comprising at least one first MOSFET, and at least one of a shunt regulator and a SSSR, the shunt regulator coupled with the boost semi-bridge SMR and the SSSR capable of being coupled with the alternator, the shunt regulator and the SSSR comprising at least one second MOSFET.

14. The IC of claim 13, wherein, during the first operative state and the second operative state of the switching regulator, the control signal is configured to trigger operations of the semi-bridge SMR, and one of the SSSR and the shunt regulator, respectively.

15. The IC of claim 14, wherein triggering the operation of the boost semi-bridge SMR comprises generating the regulated DC output voltage based at least on a first duty ratio associated with the at least one first MOSFET, and wherein triggering the operation of one of the shunt regulator and the SSSR comprises generating the regulated DC output voltage based at least on a second duty ratio associated with the at least one second MOSFET.

16. The IC of claim 15, wherein the control circuit is configured to control the operation of the SMR in the first operative state upon a determination of at least one of:

the alternator output voltage being lower than the operational DC bus voltage, and the alternator speed being lower than a predetermined threshold speed associated with the alternator.

17. The IC of claim 15, wherein the control circuit is configured to control the operation of the SSSR in the second operative state upon a determination of at least one of:

the alternator output voltage being greater than the operational DC bus voltage, and the alternator speed being greater than a predetermined threshold speed associated with the alternator.

* * * * *